(12) United States Patent
Kawazoe et al.

(10) Patent No.: US 7,653,472 B2
(45) Date of Patent: Jan. 26, 2010

(54) DEVICES, SYSTEMS AND METHODS FOR PROHIBITION OF ACCELERATION FOR COOPERATIVE SPEED CONTROL SYSTEM

(75) Inventors: Hiroshi Kawazoe, Falls Church, VA (US); Hiroshi Tsuda, McLean, VA (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 775 days.

(21) Appl. No.: 11/140,253

(22) Filed: May 31, 2005

(65) Prior Publication Data

US 2006/0271265 A1 Nov. 30, 2006

(51) Int. Cl.
*B60K 31/00* (2006.01)
(52) U.S. Cl. .................... 701/93; 701/96; 180/170
(58) Field of Classification Search ............ 701/48, 701/93, 96; 180/169, 170, 179
See application file for complete search history.

(56) References Cited

U.S. PATENT DOCUMENTS

| 5,454,442 | A | * | 10/1995 | Labuhn et al. ............ 180/169 |
| 5,774,820 | A | * | 6/1998 | Linden et al. ............. 701/93 |
| 6,161,072 | A | * | 12/2000 | Clapper .................... 701/93 |
| 6,311,121 | B1 | * | 10/2001 | Kuragaki et al. ........... 701/96 |
| 6,353,785 | B1 | * | 3/2002 | Shuman et al. ............ 701/48 |
| 6,577,937 | B1 | * | 6/2003 | Shuman et al. ............ 701/48 |
| 6,633,811 | B1 | * | 10/2003 | Aumayer .................. 701/207 |
| 6,675,081 | B2 | * | 1/2004 | Shuman et al. ............ 701/48 |
| 6,845,317 | B2 | * | 1/2005 | Craine ...................... 701/200 |
| 7,296,646 | B2 | * | 11/2007 | Kawazoe et al. ........... 180/179 |
| 7,426,432 | B2 | * | 9/2008 | Kawazoe et al. ........... 701/93 |
| 2006/0271265 | A1 | * | 11/2006 | Kawazoe et al. ........... 701/93 |

FOREIGN PATENT DOCUMENTS

| JP | 4-225500 A | 8/1992 |
| JP | 6-295398 A | 10/1994 |
| JP | 7-182598 A | 7/1995 |

OTHER PUBLICATIONS

U.S. Appl. No. 11/094,347, filed Mar. 31, 2005, Kawazoe et al.
U.S. Appl. No. 11/094,844, filed Mar. 31, 2005, Kawazoe et al.
U.S. Appl. No. 11/094,799, filed Mar. 31, 2005, Kawazoe et al.

* cited by examiner

*Primary Examiner*—Thomas G Black
*Assistant Examiner*—Wae Louie
(74) *Attorney, Agent, or Firm*—Foley & Lardner LLP

(57) ABSTRACT

A device for automatically controlling vehicle speed, including a processor. In one embodiment, the processor includes logic to automatically determine whether a first local required speed is greater than a second local required speed, and only if the first local required speed is greater than the second local required speed, automatically initiate output of a signal to a vehicle speed controller to change vehicle speed to a new set vehicle speed. In another embodiment, the processor includes logic to automatically determine a new set vehicle speed based at least on a change in local required speed and a current set vehicle speed, and only if the current set vehicle speed is greater than the determined new set vehicle speed, automatically initiate output of a signal to a vehicle speed controller to change vehicle speed to the determined new set vehicle speed.

29 Claims, 18 Drawing Sheets

DEVICES, SYSTEMS AND METHODS FOR PROHIBITION OF ACCELERATION FOR COOPERATIVE SPEED CONTROL SYSTEM

CROSS-REFERENCE TO RELATED APPLICATIONS

This patent specification is related to U.S. patent application Ser. Nos. 11/094,347, 11/094,844 and 11/094,799, filed on Mar. 31, 2005, respectively entitled Cooperative Speed Control System, System and Method For Timing of Target Speed For Cooperative Speed Control System, and System and Methods Utilizing Slope of Target Speed For Cooperative Speed Control System, all three applications to the present inventors, the contents of which are incorporated herein in their entirety.

BACKGROUND OF THE INVENTION

Speed control systems such as cruise control systems and adaptive cruise control systems (ACC) are common on vehicles. Even car owners who do not have speed control systems in their own vehicles are typically familiar with such devices and often easily implement the use of the speed control systems when using vehicles with such systems. Drivers often find it convenient to set a desired speed for the vehicle and allow the speed control system to maintain the speed of the vehicle at the set speed. However, existing speed control systems still require a relatively substantial amount of input from the driver to alter the speed of the vehicle. For example, when a speed limit changes from one speed to another, for example, from 50 miles per hour to 65 miles per hour, and the speed control system was previously set to maintain a vehicle speed of just below 50 miles per hour, the driver must affirmatively change the set speed of the vehicle control system to increase the vehicle speed. For example, if the vehicle control system was set at just below 50 miles per hour to comply with the posted speed limit of 50 miles per hour the vehicle will continue to drive at just under 50 miles per hour unless the driver takes some action. By way of a further example, traffic conditions may change such that the driver who is driving below the posted speed limit due to congestion should increase the vehicle speed once the congestion on the roadway has been relieved. If, for example, the driver is driving in a high traffic area where the posted speed limit is 55, but the density of vehicles on the roadway will only permit the driver to drive at 40 miles per hour and the driver sets the speed control system to 40 miles per hour, once the traffic condition changes such that the cars around him may again safely travel at (or under) the posted speed limit of 55 miles per hour, the driver must affirmatively change the speed setting of the speed control system to increase the speed of the vehicle.

Thus, there was need for a speed control system that better interacts with a changing vehicle environment. Such a need is fulfilled, at least in part, by the cooperative speed control systems disclosed in co-pending U.S. patent application Ser. Nos. 11/094,347, 11/094,844 and 11/094,799 filed on Mar. 31, 2005, respectively entitled Cooperative Speed Control System, System and Method For Timing of Target Speed For Cooperative Speed Control System, and System and Methods Utilizing Slope of Target Speed For Cooperative Speed Control System, all three applications by the present inventors, the contents of which are incorporated herein in their entirety. Those applications detail methods, apparatuses and systems for controlling vehicle speed that better interacts with a changing vehicle environment including methods, systems and apparatuses for automatically decreasing and increasing vehicle speed.

SUMMARY OF THE INVENTION

The present invention provides a new cooperative speed control system. In some respects, the cooperative speed control system according to the present invention is a modification of the cooperative speed control systems according to the teachings of the above referenced applications. One such modification includes a regime of prohibitions on automatically increasing vehicle speed/accelerating the vehicle.

In an embodiment of the invention, there is a device adapted to automatically control vehicle speed, comprising a processor adapted to receive at least a first signal indicative of a first local required speed and a second signal indicative of a second local required speed received after the first signal; wherein the processor includes logic to automatically determine whether the first local required speed is greater than the second local required speed and only if the first local required speed is at least one of (i) greater than or (ii) equal to the second local required speed, automatically initiate output of a signal to a vehicle speed controller to change vehicle speed to a new set vehicle speed.

In another embodiment of the invention, there is a device adapted to automatically control vehicle speed, comprising a processor adapted to receive at least a first signal indicative of a first local required speed, a second signal indicative of a second local required speed received after the first signal, a third signal indicative of a value of a current set vehicle speed and an input indicative of a current state of a driver of the vehicle, wherein the processor includes logic to automatically determine a new set vehicle speed based at least on the first local required speed, the second local required speed, and the current set vehicle speed automatically determine at least one of (i) whether the first local required speed is less than the second local required speed and (ii) whether the current set vehicle speed is less than the determined new set vehicle speed, and if (A) the current state of a driver of the vehicle meets at least one predetermined requirement and at least one of (iii) the first local required speed is less than the second local required speed and (iv) the current set vehicle speed is less than the determined new set vehicle speed; or (B) at least one of (v) the first local required speed is greater than or equal to the second local required speed and (vi) the current set vehicle speed is greater than or equal to the determined new set vehicle speed, automatically initiate output of a signal to a vehicle speed controller to change vehicle speed to the new set vehicle speed.

DETAILED DESCRIPTION OF THE PREFERRED EMBODIMENTS

A first embodiment of a cooperative speed control system according to the present invention relates to a system that automatically changes a set speed (V_set) of a host vehicle such as that set using the host vehicle's speed control system (e.g., cruise control, adaptive cruise control system (ACC), etc.) to a new set speed (V_set_new) according to the teachings of the above referenced co-pending applications. However, in this embodiment, the cooperative speed control system prohibits changing the speed to the new set speed if the new set speed is higher than the previous set vehicle speed. That is, if the new set vehicle speed is lower than the previously set speed, the set speed will automatically be changed to the new set vehicle speed. However, if the new set vehicle speed is higher than the previously set speed, the set speed will not automatically be changed to the new set vehicle speed. In the first embodiment, the change in the set speed is performed in response to, for example, a change in a posted speed limit. The change in speed limit may be communicated to the vehicle in a variety of ways, such as, for example, via a wireless radio broadcast from an infrastructure communication device received by a radio onboard the host vehicle.

An exemplary scenario implementing the first embodiment will now be described, followed by a more detailed description of some other embodiments of the invention.

Figure 1:
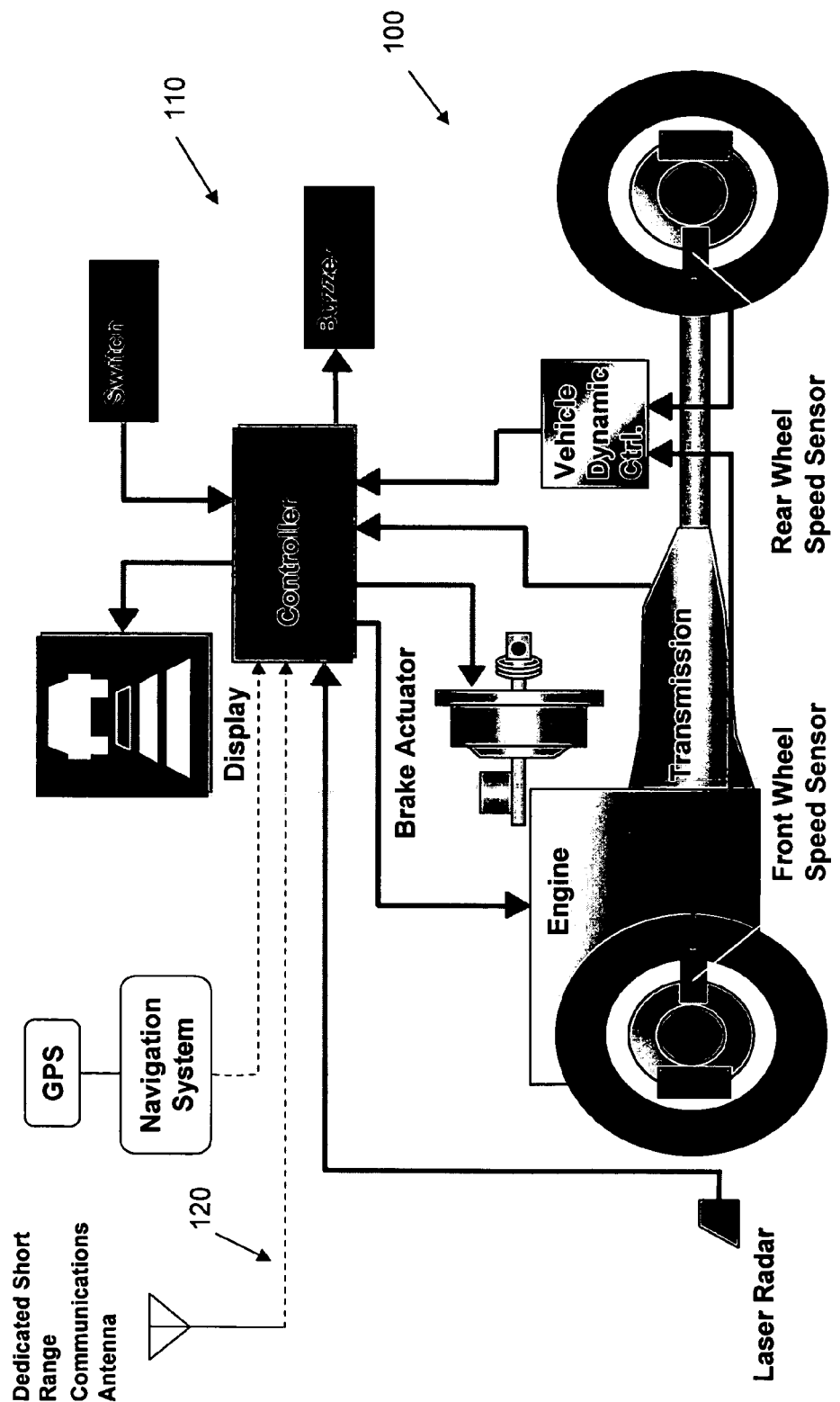
FIG. 1 presents a schematic of an embodiment according to the present invention.

In an exemplary scenario, there is a host vehicle 100 (see FIG. 1) that is traveling down a roadway. The host vehicle 100 has a cooperative speed control system according to the first embodiment of the present invention that also has a speed control system 110 that may include a processor where the driver has inputted a set speed and/or activated the system in a manner where the set speed of the vehicle speed is set/adjusted automatically (as in, for example, the case of activation of ACC). For the purposes of this scenario, the driver has activated a cruise control system to maintain a set speed (V_set) of 65 miles per hour.

Concurrently, the host vehicle comes into range/passes what will hereinafter be referred to as an infrastructure communication device (described in greater detail below) that communicates a required local speed (V_req) (e.g., the speed limit) to the host vehicle by way of, for example, a radio broadcast sent by the device, that is received by a receiver system 120. For the purposes of this scenario, the current required local speed is 65 miles per hour for the portion of the roadway on which the host vehicle is currently traveling based on a communication received by the last infrastructure communication device passed by the host vehicle. Note that the set speed could have been set before, during or after receipt of the communication from the infrastructure communication device. This required local speed shall be designated V_req1.

The host vehicle later passes/comes into range of another infrastructure communication device that broadcasts a radio signal communication indicative of the required local speed (i.e., speed limit) for that particular stretch of roadway. For example, the infrastructure communication device may broadcast a signal that the required local speed for this particular portion of roadway is 50 miles per hour. This broadcast is received by the vehicle. The required local speed of 50 miles per hour (V_req2) that is communicated by the infrastructure communication device represents a change of required local speed from the previously communicated required local speed (V_req1), and thus there is a differentiation in the required local speeds. That is, the new required local speed of 50 miles per hour represents a change in required local speed (ΔV_req) of negative 15 miles per hour (ΔV_req=−15 mph). The differentiation in speed is thus negative 15 miles per hour. This change in speed is calculated or otherwise determined by the cooperative speed control system.

The cooperative speed control system then automatically adjusts the set speed to a new set speed (V_set_new) based on the change of the required local speeds. In this scenario, the new set speed (V_set_new) would be a speed reduced by 15 miles per hour from the previously set speed (V_set), owing to the reduction in the required speeds (V_req1=65 to V_req2=50 mph). Thus, the new set speed (V_set_new) would be 50 miles per hour.

The host vehicle then passes/comes into range of another infrastructure communication device that broadcasts a radio signal communication indicative of the required local speed (i.e., speed limit) for that particular stretch of roadway. For example, the infrastructure communication device may broadcast a signal that the required local speed for this particular portion of roadway is 60 miles per hour. This broadcast is received by the vehicle. The required local speed of 60 miles per hour (V_req3) that is communicated by the infrastructure communication device represents a change of required local speed from the previously communicated required local speed (V_req2), and thus there is a differentiation in the required local speeds. That is, the new required local speed of 60 miles per hour represents a change in required local speed (ΔV_req) of positive 10 miles per hour (ΔV_req=10 mph). The differentiation in speed is thus positive 10 miles per hour. This change in speed is calculated or otherwise determined by the cooperative speed control system.

However, in contrast to the scenario where the cooperative speed control system automatically adjusted the set speed downward, the cooperative speed control system in this instance does not automatically adjusts the set speed to a new set speed (V_set_new) based on the change of the required local speeds. That is, the cooperative speed control system recognizes that a newly determined set speed would be greater than the current set speed by 10 miles an hour, and thus prohibits the automatic increase in speed. In a variation to this embodiment, the cooperative speed control system may instead or in addition determine that the second local required speed is not greater than the third local required speed, and thus prohibit automatic speed increase based on this determination. Examples of suitable methods, devices and systems used to determine the new set speed shall now be specifically detailed.

In a device for implementing the first exemplary embodiment, the device includes a processor that automatically determines whether the first local required speed is greater than the second local required speed. If the first local required speed is greater, the device will permit automatic vehicle speed reduction to a newly determined set vehicle speed. For example, if the first local required speed is 60 mph and the second local required speed is 50 mph, the device would automatically determine that there is a reduction in local required speed and thus permit the vehicle speed to be changed to a determined new set vehicle speed because the determined new set vehicle speed would constitute a reduction in current vehicle speed/current set vehicle speed in view of an algorithm that reduces set speed when there is a reduction in local required speeds. (Such algorithms are discussed in greater detail below.) That is, in this embodiment, the device automatically initiates output of a signal to a vehicle speed controller to change vehicle speed to a new set vehicle speed only if the first local required speed is greater than the second local required speed.

In a variation to this embodiment, instead of comparing the first local required speed to the second local required speed, the device compares the current set vehicle speed to a determined new set vehicle speed, which may be determined, for example, based on the first local required speed, the second local required speed, and the current set speed (again, such determinations are discussed in greater detail below). In this embodiment, if the current set vehicle speed is greater than the determined new set vehicle speed, the device will initiate output of a signal to a vehicle speed controller to automatically change the vehicle speed to the new set vehicle speed, and thus the set speed of the vehicle will be reduced. However, if the current set vehicle speed is not greater than (e.g., less than) the determined new set vehicle speed, the device will not increase the vehicle speed. That is, an automatic vehicle speed increase is prohibited.

Figure 2A:
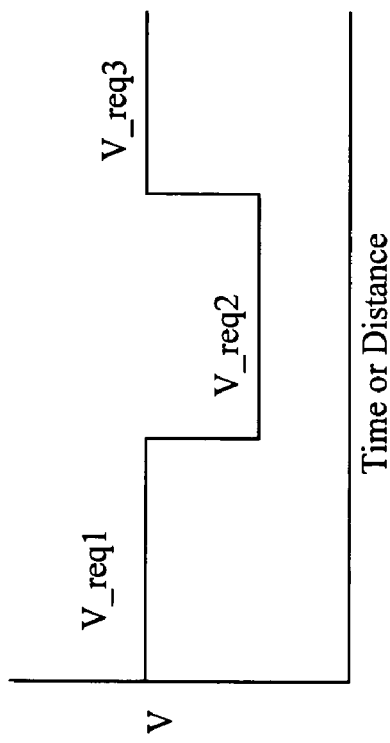
FIGS. 2a and 2b present graphical representations of vehicle velocity (V) versus time or distance according to an embodiment of the present invention where vehicle speed is permitted to decrease but not increase with changes in required local speeds.
Figure 2B:
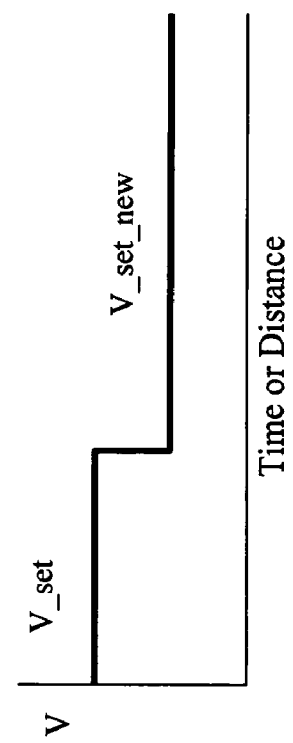

FIG. 2a and FIG. 2b schematically illustrate the change in speed (or lack thereof of a vehicle utilizing a cooperative speed control device according to the present invention.

Figure 3:
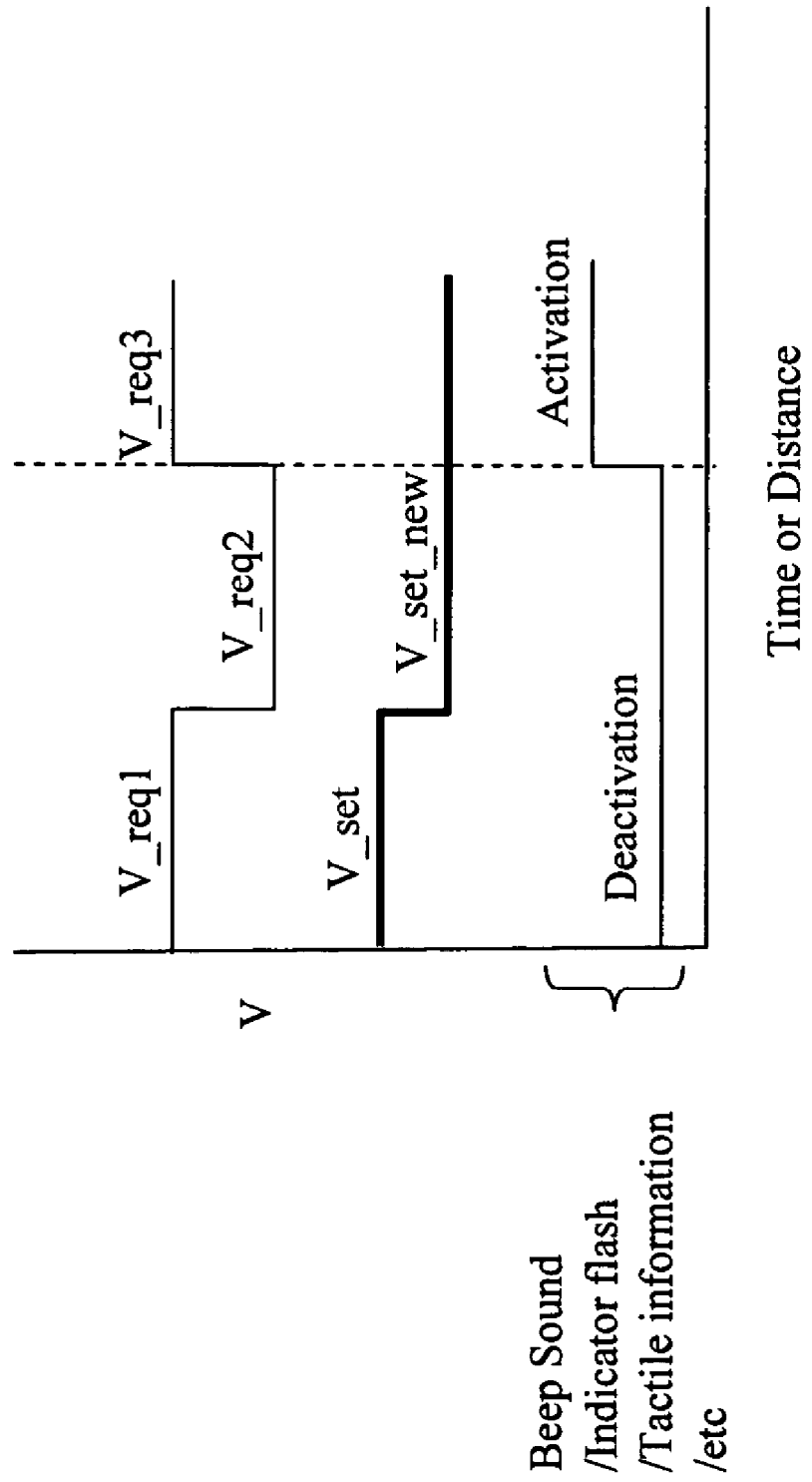
FIG. 3 presents a graphical representation of vehicle velocity (V) versus time or distance according to an embodiment of the present invention where vehicle speed is permitted to decrease but not increase with changes in required local speeds, and an indicator is activated when the required local speed increases.

In another variation of the first embodiment of the present invention, information is provided to a driver of the vehicle to indicate that the local required speed has increased and/or that the determined set speed has increased from the current set speed. In such variations, the driver is notified that the local speed has increased and/or that the determined set speed has increased over the current set speed when an automatic vehicle speed increase is prohibited (for example, as just described). This notification may indicate to the driver to manually increase the set speed if desired. By way of example only and not by way of limitation, the information may include a beep, a flashing light, tactile information and/or an audio or visual warning. In an exemplary embodiment, a processor that is part of the device outputs a signal to an indicator that indicates to the driver the status of the changed speed limit conditions. FIG. 3 schematically illustrates a scenario utilizing this variation of the first embodiment.

Figure 4:
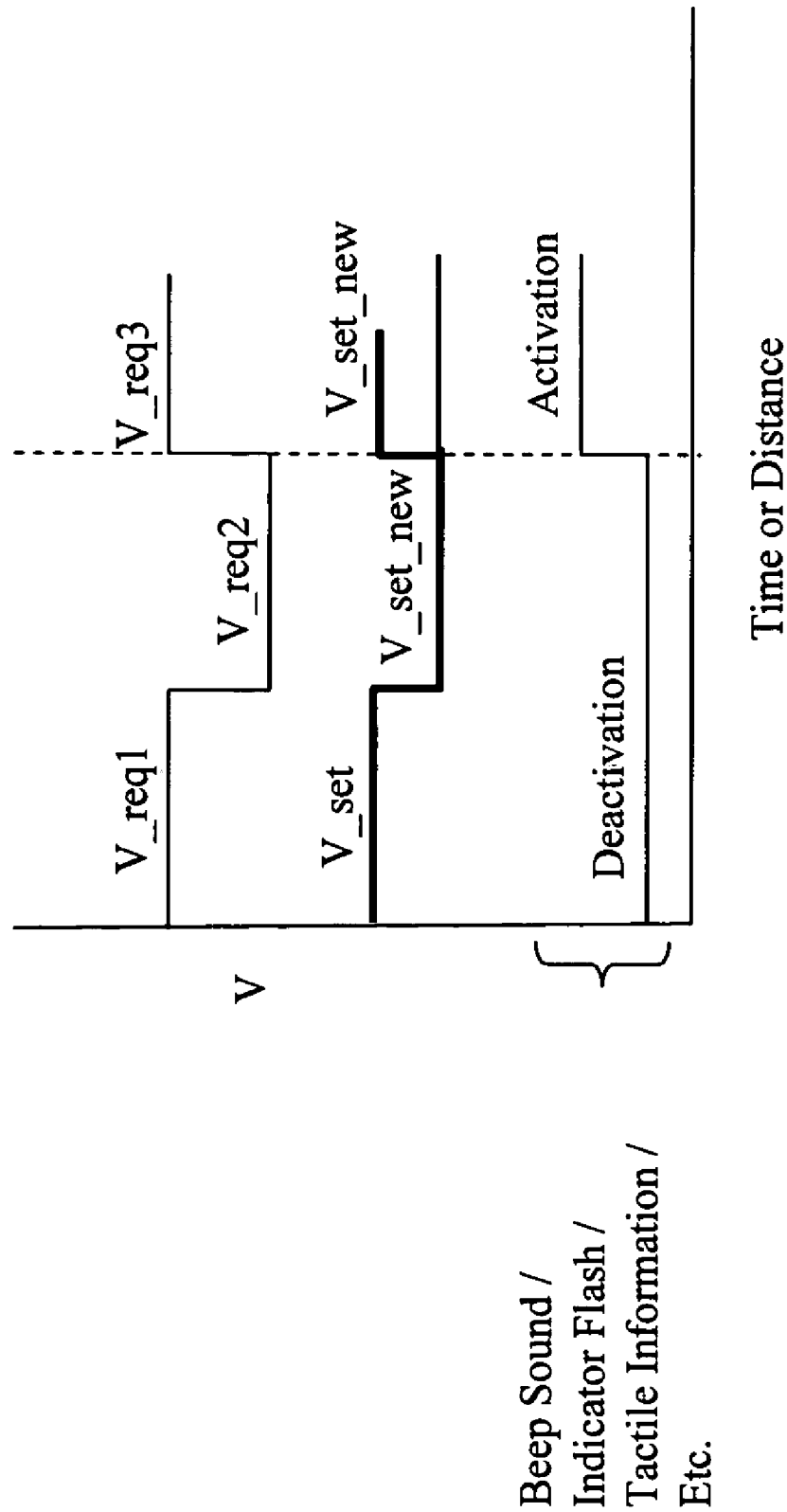
FIG. 4 presents a graphical representation of vehicle velocity (V) versus time or distance according to an embodiment of the present invention where vehicle speed is permitted to decrease and increase with changes in required local speeds, and an indicator is activated when the required local speed increases.

In another embodiment of the present invention, change in vehicle speed is not prohibited in the scenario where the first local required speed is lower than the second local required speed and/or the current set vehicle speed is lower than the determined set vehicle speed. Instead, vehicle speed is automatically changed and an indication is provided to the driver that the vehicle will and/or has already begun to accelerate/increase in speed. FIG. 4 presents a schematic representation of an automatic change in speed based on the just described scenario where an indicator is activated to notify the driver that the vehicle speed will increase/is increasing. In this embodiment, the information/indication may be the same as that described in the above embodiment.

In another embodiment of the present invention, an automatic increase in vehicle speed is prohibited if a determination is made that a current state of the environment around the vehicle is indicative of one or more predetermined environments. By way of example only and not by way of limitation, a device according to the present invention may include a processor that receives input indicative of a current state of environment around the vehicle. Such current states include, but are not limited to, whether or not the vehicle is driving around/approaching a corner, whether the vehicle is passing through/approaching an intersection, whether the vehicle is approaching/driving on an on-ramp, whether the vehicle is approaching/driving on an off-ramp, whether the vehicle is driving on a congested road (e.g., whether a high traffic situation exists proximate to the vehicle), whether the vehicle is approaching/driving in a work zone, whether the vehicle is approaching a traffic light, whether the vehicle is approaching a traffic light that is in a certain condition (e.g., the vehicle is approaching a red traffic light and/or the vehicle is approaching a green traffic light that is about to turn red) and/or whether the vehicle is driving in and/or approaching a residential area. In an exemplary embodiment according to the invention, if the processor receives input indicative that the vehicle is in a predetermined environment, including any one of the just described environments, the processor may prevent a vehicle speed controller from changing a vehicle set speed to a determined new set vehicle speed if such a change represents an increase and/or if the second local required speed is greater than the first local required speed.

In one embodiment of the present invention, the processor automatically analyzes the input indicative of a current state of environment around the vehicle, and if the current state of the environment around the vehicle is such that there is an increased chance of a need to reduce speed (e.g., a sensor on board the vehicle detects, in front of the vehicle, a flashing red and/or blue and/or yellow light at a predetermined frequency), the processor will automatically prevent a vehicle's speed controller from changing a vehicle set speed to a determined new set vehicle speed if that determined new set vehicle speed will result in an increase in vehicle speed and/or if the second local required speed is greater than the first local required speed.

In another embodiment of the present invention, the processor includes logic to automatically analyze input indicative of a current state of environment around the vehicle and determine whether the current state of environment around the vehicle is such that there is an increased chance of reduced driver control of the vehicle. If such a determination is made, the processor automatically prevents a vehicle speed controller from changing a vehicle speed to a determined new set vehicle speed in the event that such a change would result in an increase in vehicle speed (i.e., current set vehicle speed is less than the determined new set vehicle speed) and/or if the second local required speed is greater than the first local required speed.

In another embodiment of the present invention, the processor analyzes the environmental state input and determines whether the input is indicative of a current state of environment around the vehicle that includes an environment where the vehicle is driving on a surface with a low coefficient of friction (e.g., ice, water logged roadway, oil, etc.), whether the vehicle is driving in rain, whether the vehicle is driving in snow, whether the vehicle is driving in icy conditions and/or whether the vehicle is driving in low visibility conditions. If one or more of the just listed environments are determined to be present around the vehicle, the processor may automatically prevent the vehicle speed controller from changing the vehicle speed to a determined new set vehicle speed if that change in vehicle speed represents an increase in vehicle speed and/or if the second local required speed is greater than the first local required speed.

In another embodiment of the present invention, the device analyzes the environment around the vehicle and determines that the environment is such that an automatic increase in speed should not be prohibited. By way of example only and not by way of limitation, if the current state of the environment is such that the vehicle is driving on an unobstructed road with minimal traffic, all other environmental conditions being acceptable, the vehicle speed may be automatically increased by the cooperative speed control system to a determined new set vehicle speed. Still further, by way of example only and not by way of limitation, one embodiment of the present invention automatically analyzes the input indicative of a current state of the environment around a vehicle, and if a determination is made that there is a reduced chance and/or a normal chance of a need to reduce vehicle speed (e.g., a sensor determines that visibility is unlimited and the sun is positioned behind the vehicle, etc.), a vehicle's speed controller will be permitted to increase vehicle speed to a determined new set vehicle speed.

In another embodiment of the present invention, if the device determines that the state of environment around the vehicle includes an environment where the vehicle is driving on a straight segment of road and/or the vehicle is driving on a non-congested road, the processor will automatically initiate output of a signal to a vehicle speed controller to change vehicle speed to a determined new set vehicle speed, if such an increase is warranted based on a change in local required speeds, etc.

In yet another embodiment of the present invention, the processor analyzes the input indicative of a current environment state around the vehicle, and if a determination is made that there is a reduced chance and/or a normal chance of reduced driver control of the vehicle, based on the analysis of the current state of the environment around the vehicle (e.g., a sensor determines that there is a high coefficient of friction between the vehicle tires and the road), automatic vehicle speed increase will be permitted.

In another embodiment of the present invention, the device includes a processor that analyzes the input indicative of current state of environment around the vehicle, and if the determination is made that for example, the vehicle is driving on a surface with a normal coefficient of friction, the vehicle is driving in clear conditions, the vehicle is driving in above freezing conditions and/or the vehicle is driving in normal and/or better than normal and/or close to normal visibility conditions, the processor will automatically initiate output of a signal to a vehicle speed controller to increase the vehicle's speed to a determined new set vehicle speed, if such an increase is applicable.

In another embodiment of the present invention, the processor in the device is adapted to receive an input that is indicative of a current state of a driver of the vehicle. In an exemplary embodiment, if the current state of the driver of the vehicle meets a predetermined requirement (e.g., driver is drowsy), and if the vehicle speed control system determines that the new set vehicle speed would result in an increase in speed and/or if the second local required speed is greater than the first local required speed (e.g., local speed has increased), the processor will automatically prevent a vehicle speed controller from changing a vehicle speed to the determined new set vehicle speed. In another embodiment of the present invention, the processor automatically analyzes the input indicative of a current state of a driver of the vehicle, and if a determination is made that there is an increased chance of diminished driver reaction time based on the current state of the driver of the vehicle (e.g., a sensor determines that the driver is utilizing a cell phone), the processor will prevent a vehicle speed controller from changing a vehicle speed to a determined new set vehicle speed in the event that the change represents an increase in the current vehicle speed and/or if the second local required speed is greater than the first local required speed. In another embodiment, the processor analyzes the input indicative of the current state of the driver of the vehicle, and if a determination is made that the driver is drowsy, the driver is distracted, the driver is inattentive, the driver is looking away from a direction ahead or approximately ahead of the vehicle and/or that the driver is otherwise multitasking, the processor will automatically prevent a vehicle speed controller from changing a vehicle speed to a determined new set vehicle speed if that change represents an increase in vehicle speed and/or if the second local required speed is greater than the first local required speed.

In another embodiment of the invention, the processor in the cooperative speed control system is adapted to receive input indicative of a current state of the driver of the vehicle. The processor automatically determines whether the current state of the driver of the vehicle meets a predetermined requirement, and if this predetermined requirement is met and the cooperative speed control system determines that the current set vehicle speed should be increased to a determined new set vehicle speed and/or if the second local required speed is greater than the first local required speed, the processor automatically initiates output to change the vehicle speed to the new set vehicle speed. By way of example and not by way of limitation, if the processor determines that the input indicative of the driver's current state is such that there is a reduced chance and/or a normal chance of diminished driver reaction time (e.g., an on-board processor analyzes the driver's reactions to changing environmental conditions and compares the reactions to empirical data for an alert driver, etc.) the processor will permit the vehicle speed to be automatically increased by the cooperative speed control system. Still further by example, if the processor determines that the driver is, for example, looking ahead, reacting in a manner that, when compared to empirical data and/or data collected based on prior driver actions on a common stretch of roadway (stored for example, in a memory onboard the vehicle), and/or that the driver is currently making frequent adjustments to various controls of the vehicle, the processor will permit the cooperative speed control system to increase vehicle speed.

It is noted that in many of the embodiments described above, determinations are made based in part on whether a first local required speed is greater than a second local required speed and/or whether a first local required speed is less than a second local required speed, to determine whether or not to permit an automatic speed increase. Still further, in some of the other embodiments described above, determinations are made based on whether the current speed would be increased if the vehicle speed was changed to a determined new set speed, or whether the speed of the vehicle would be decreased if the vehicle speed was changed to a determined new set vehicle speed (e.g., the current set speed is greater than or less than the determined new set vehicle speed), to determine whether or not to prohibit automatic speed increase. It is noted that in some embodiments of the invention, a determination may be made as to whether or not a first local required speed is equal to a second local required speed and/or whether a current set vehicle speed is equal to a determined new set vehicle speed, to determine whether to permit or prohibit the cooperative speed control system from affecting vehicle speed. Such may be the case for simplicity in program design and/or to ensure greater redundancy. Thus, according to an embodiment of the present invention, the processor may include logic to determine whether the first local required speed is greater than or equal to the second local required speed to make a determination that a current set speed should be changed to a determined new set speed. Still further, a processor according to the present invention may include logic to make a determination that the current set vehicle speed is greater than or equal to a new determined set vehicle speed to determine whether or not to change the current vehicle speed to a determined new set vehicle speed.

It is further noted that in many of the embodiments described above, only an increase in speed from a current set speed to a determined new set speed is addressed (or an increase of a second local required speed from a first local required speed is only addressed). That is, the embodiments described above only discuss the prohibition of an increase (not a decrease) in vehicle speed under certain conditions. (e.g., if certain conditions are present that would otherwise prohibit an increase in speed, but an automatic decrease in vehicle speed would be the result, the embodiments described above would still allow the vehicle speed controller to decrease the speed of the vehicle). However, other embodiments of the present invention include a device where a decrease in speed is also prohibited if certain conditions are met. That is, in the scenario where a decrease in speed is called for, a cooperative speed controller according to some embodiments would not be permitted to decrease the speed even though in other embodiments of the present invention the decrease in speed would be permitted.

FIGS. 5-11 illustrate specific implementations of the invention. One of skill in the art will understand that these figures provide some examples of the techniques described in detail above. Because such techniques have been described in detail above and/or may readily be implemented by one of ordinary skill in the art based on the figures in combination with the teachings and knowledge in the art, an in-depth detailed description of these figures is not provided.

Figure 5:
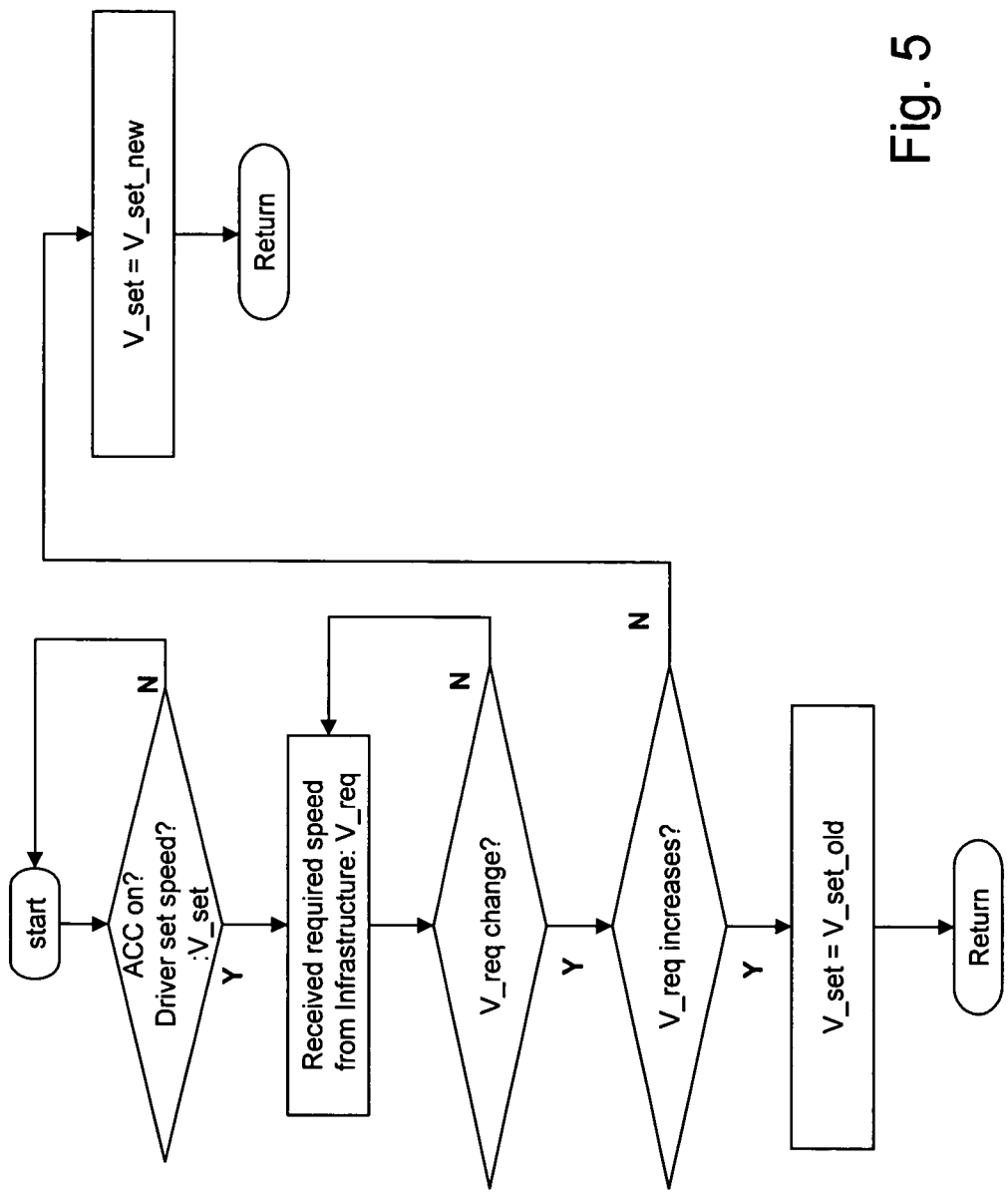
FIG. 5 presents a flow chart for an algorithm for implementing an embodiment of the present invention, where if a determination is made that V_req (i.e., local required speed) has changed and that change represents an increase in local required speed, the algorithm prevents the set speed from automatically changing.

FIG. 5 presents an algorithm for implementing an embodiment of the present invention. If a determination is made that V_req (i.e., local required speed) has changed and that change represents an increase in local required speed, the algorithm prevents the set speed from automatically changing. (Note that algorithms to determine the new set speed are detailed below.)

Figure 6:
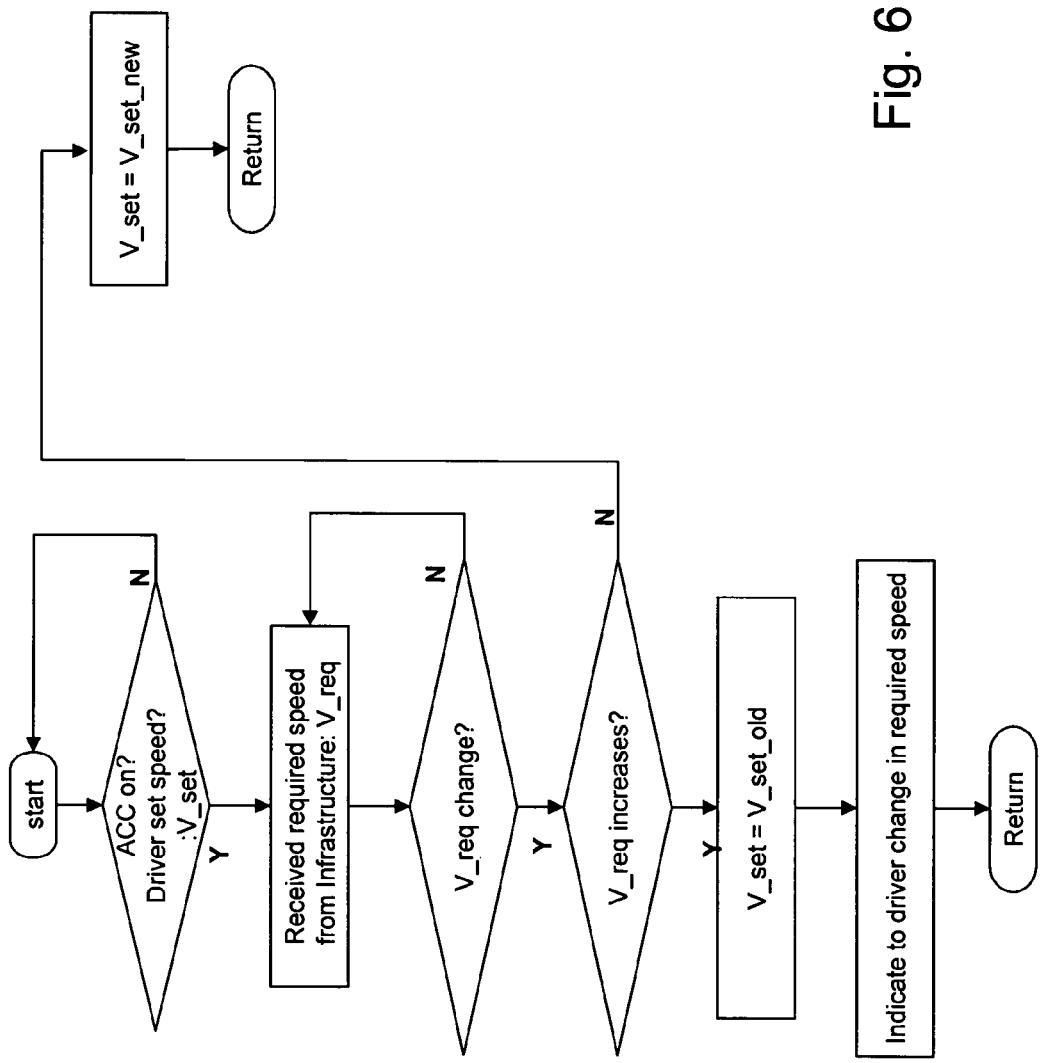
FIG. 6 presents another flow chart for an algorithm for implementing an embodiment of the present invention similar to that of FIG. 5, where if a determination is made that V_req has changed and that change represents an increase in local required speed, the algorithm prevents the set speed from automatically changing and an indication is given to the driver that the required speeds have changed and/or that the vehicle speed has not changed.

FIG. 6 parallels the algorithm of FIG. 5, except that if a determination is made that V_req has changed and that change represents an increase in local required speed, the algorithm prevents the set speed from automatically changing and an indication is given to the driver that the required speeds have changed and/or that the vehicle speed has not changed.

Figure 7:
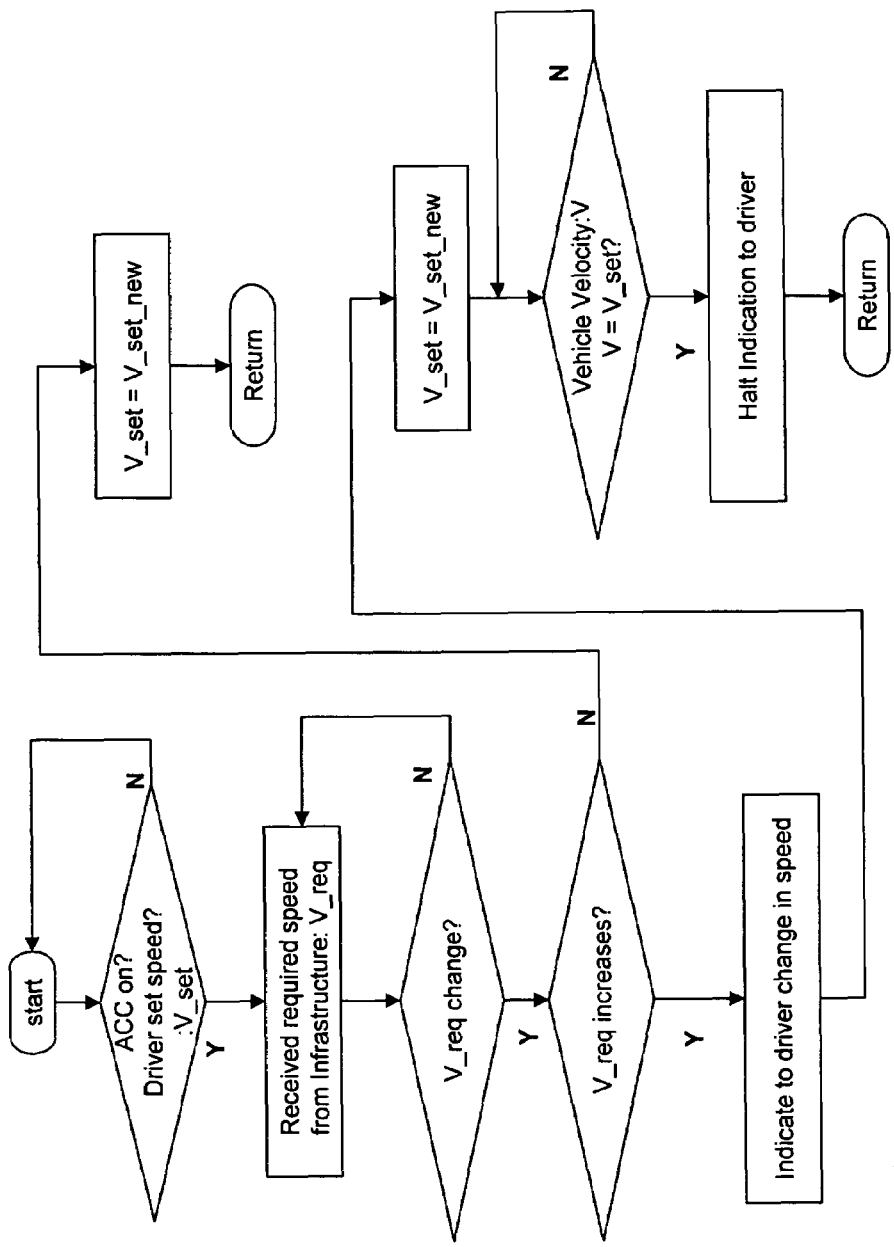
FIG. 7 presents another flow chart for an algorithm for implementing an embodiment of the present invention, where if a determination is made that V_req has changed and that change represents an increase in local required speed, the algorithm provides an indication to the driver that the speed has changed and/or that the vehicle will accelerate/has begun to accelerate, and permits the set speed to automatically change.

FIG. 7 presents an algorithm where if a determination is made that V_req has changed and that change represents an increase in local required speed, the algorithm provides an indication to the driver that the speed has changed and/or that the vehicle will accelerate/has begun to accelerate, and permits the set speed to automatically change.

Figure 8:
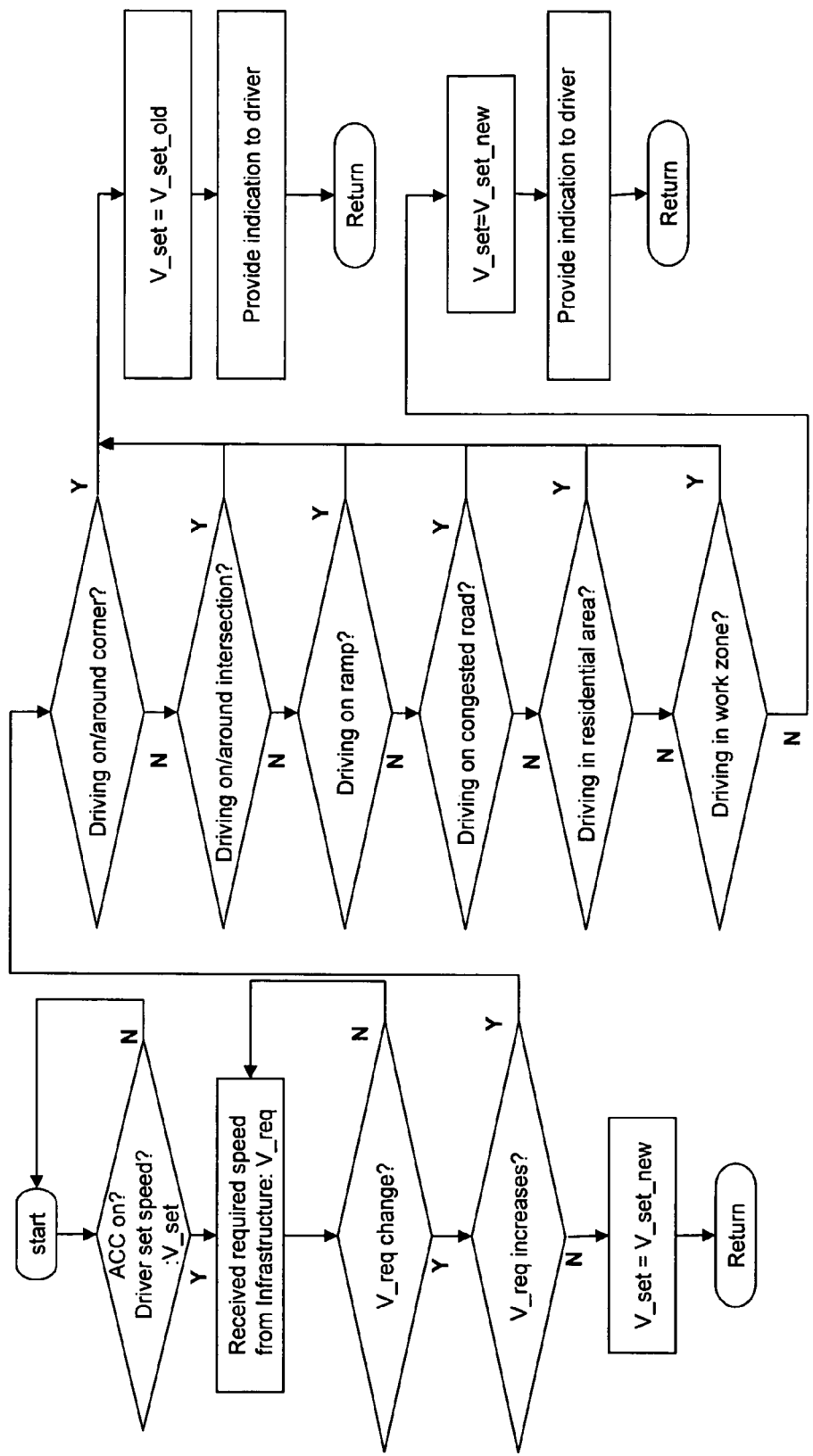
FIG. 8 presents another flow chart for an algorithm for implementing an embodiment of the present invention, where if a determination is made that V_req has changed and that change represents an increase in local required speed and a determination is made that the vehicle is driving in one or more predetermined environmental conditions, the algorithm prevents the set speed from automatically changing.

FIG. 8 presents an algorithm where if a determination is made that V_req has changed and that change represents an increase in local required speed and a determination is made that the vehicle is driving in one or more predetermined environmental conditions, the algorithm prevents the set speed from automatically changing. However, if a determination is made that the change in V_req represents a decrease in local required speed, the algorithm permits the speed to change.

Figure 9:
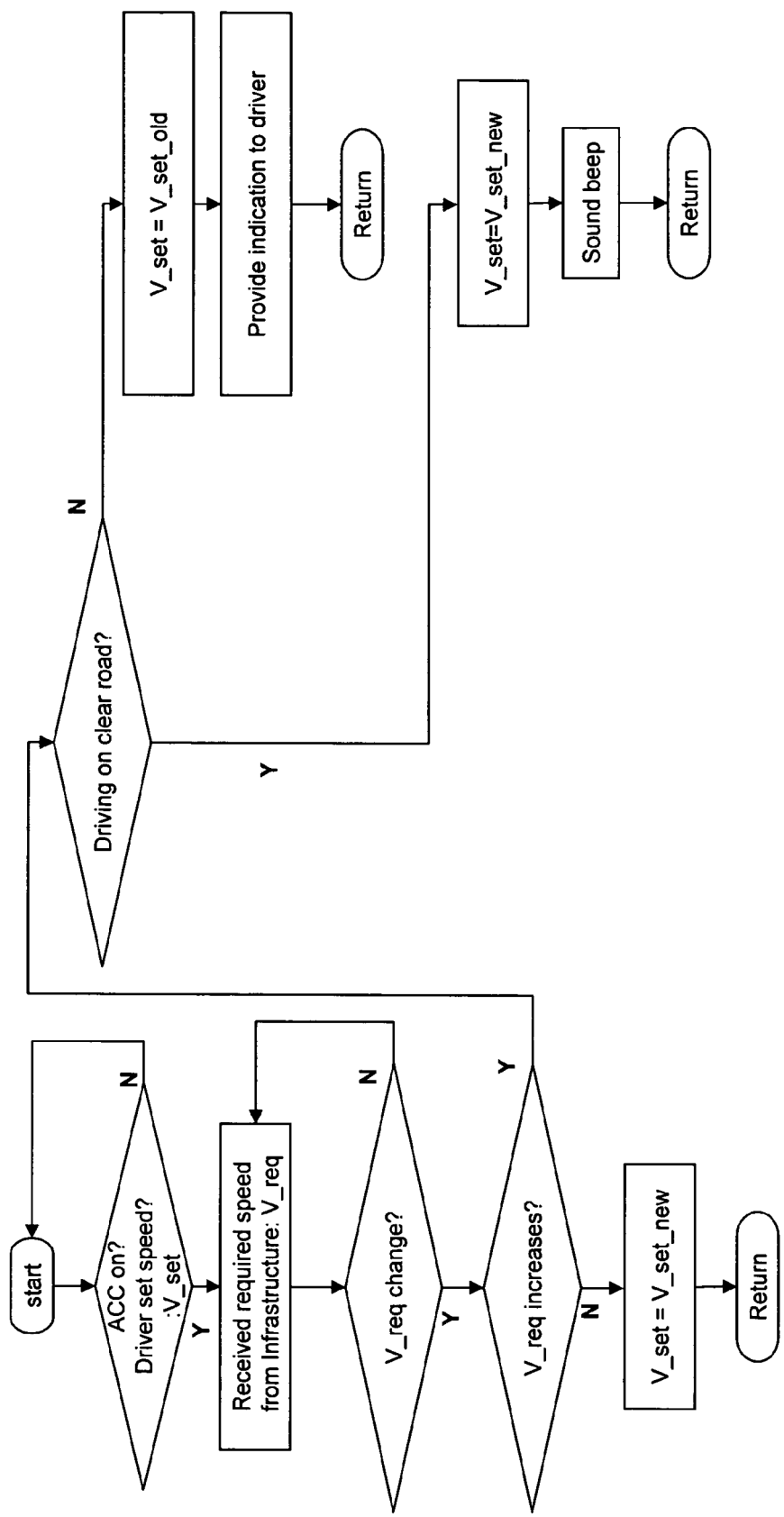
FIG. 9 presents another flow chart for an algorithm for implementing an embodiment of the present invention.

FIG. 9 presents an algorithm where if a determination is made that V_req has changed and that change represents an increase in local required speed and a determination is made that the vehicle is not driving in clear conditions, the algorithm prevents the set speed from automatically changing. However, if a determination is made that the change in V_req represents a decrease in local required speed, the algorithm permits the speed to change.

Figure 10:
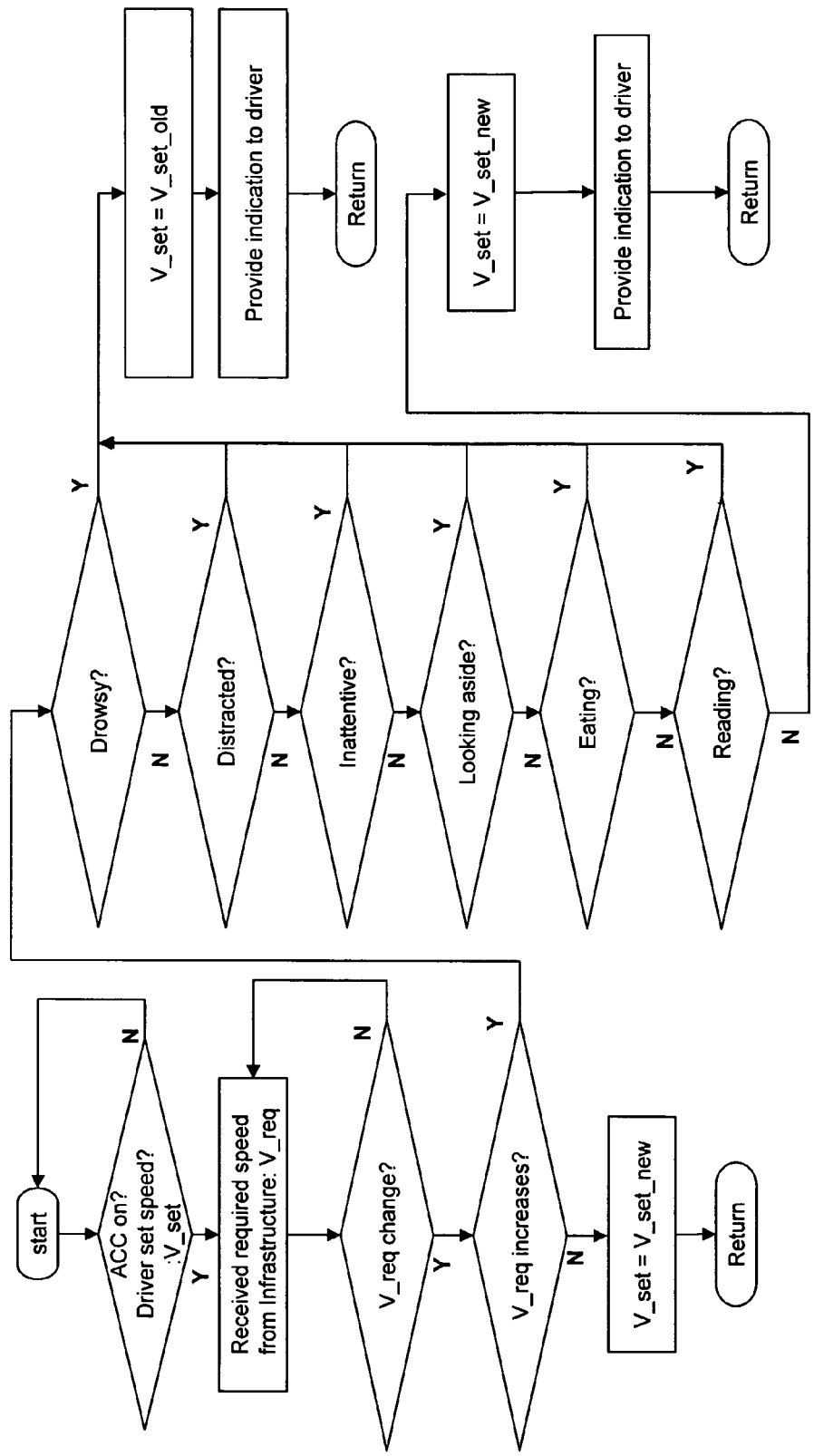
FIG. 10 presents another flow chart for an algorithm for implementing an embodiment of the present invention, where if a determination is made that V_req has changed and that change represents an increase in local required speed and a determination is made that the driver of the vehicle is in one or more predetermined states, the algorithm prevents the set speed from automatically changing.

FIG. 10 presents an algorithm where if a determination is made that V_req has changed and that change represents an increase in local required speed and a determination is made that the driver of the vehicle is in one or more predetermined states, the algorithm prevents the set speed from automatically changing. However, if a determination is made that the change in V_req represents a decrease in local required speed, the algorithm permits the speed to change.

Figure 11:
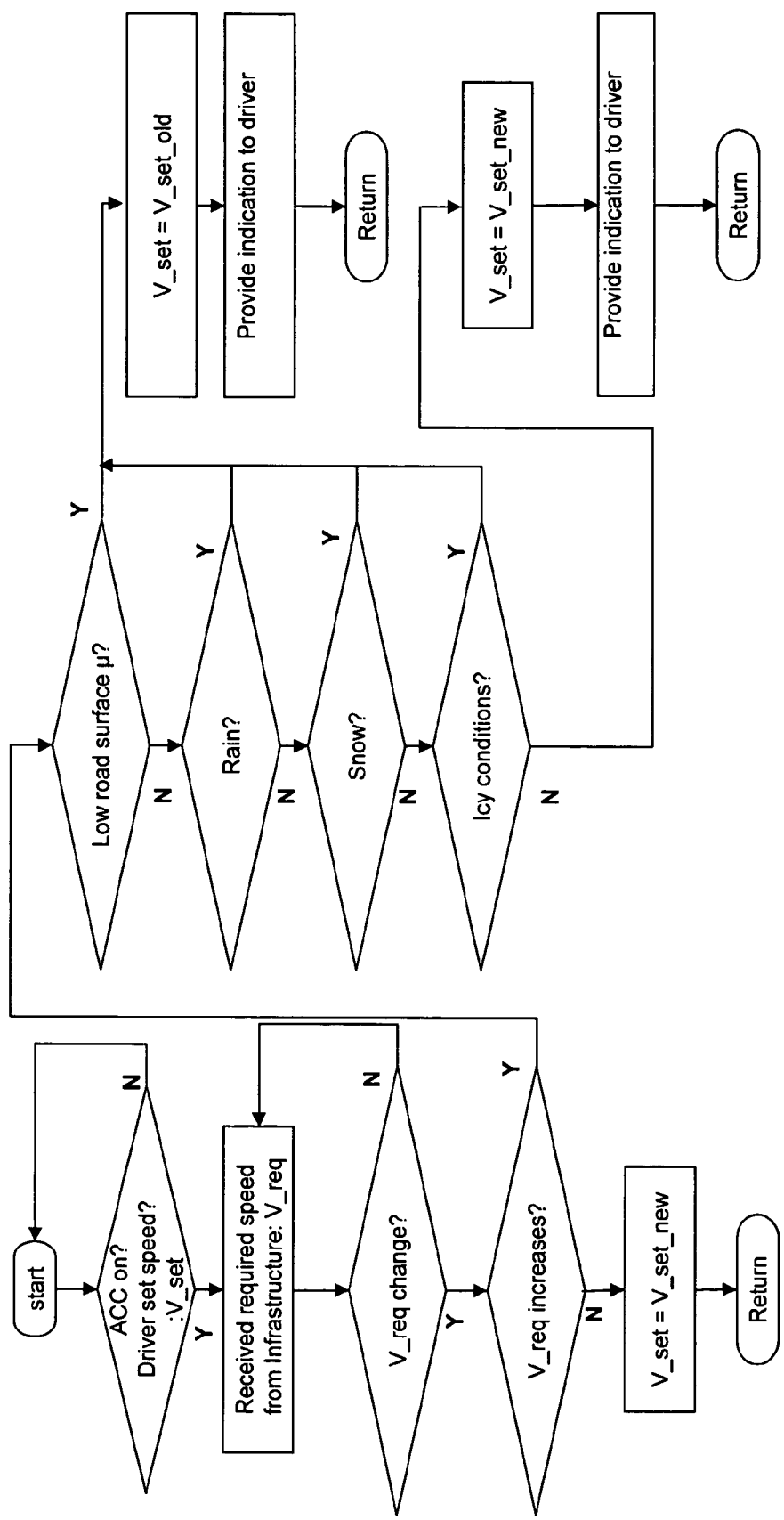
FIG. 11 presents another flow chart for an algorithm for implementing an embodiment of the present invention, where if a determination is made that V_req has changed and that change represents an increase in local required speed and a determination is made that the vehicle is driving in one or more predetermined environmental conditions, the algorithm prevents the set speed from automatically changing.

FIG. 11 presents another algorithm where if a determination is made that V_req has changed and that change represents an increase in local required speed and a determination is made that the vehicle is driving in one or more predetermined environmental conditions, the algorithm prevents the set speed from automatically changing. However, if a determination is made that the change in V_req represents a decrease in local required speed, the algorithm permits the speed to change.

As will be recognized, the present invention may be combined with many if not all of the cooperative speed control techniques described in the above referenced applications, particularly those techniques that relate to determining new set vehicle speeds. In the interest of brevity, only some of those techniques will now be described. However, it will be noted that other techniques presented in those applications and not discussed herein may also be combined with the present invention. Still further, other techniques for automatic speed control not specifically disclosed in the referenced applications may be utilized with the present invention of prohibition of automatic vehicle speed change.

In one exemplary technique described in the referenced applications, the change in the set speed (ΔV_req) has a one-to-one or substantially one-to-one relationship to the change in the required speeds. For example, if V_req1 is 65 miles per hour and V_req2 is 50 miles per hour, the difference in speed ΔV_req would be negative 15 miles per hour. Thus, V_set, which was, for example, previously set at 65 miles per hour, would now be determined to be 50 miles per hour (i.e., determined V_set_new=50 mph). Still further by example, following the one-to-one relationship in ΔV_req, if V_set was previously set at 60 miles per hour in the above scenario (i.e., the current set speed of the speed control system was 5 miles per hour below V_req1) the determined new set speed (V_set_new) would be 45 miles per hour. That is, V_set would still be 15 miles per hour below the previously set speed, reflecting a one-to-one change in speed of the required local speed. Thus, according to this exemplary scenario, determined V_set_new may be determined based on the equation $$\text{Determined } V\_set\_new = V\_set + \Delta V\_req \quad (1)$$

where $$\Delta V\_req = V\_req2 - V\_req1 \quad (2).$$

Figure 12A:
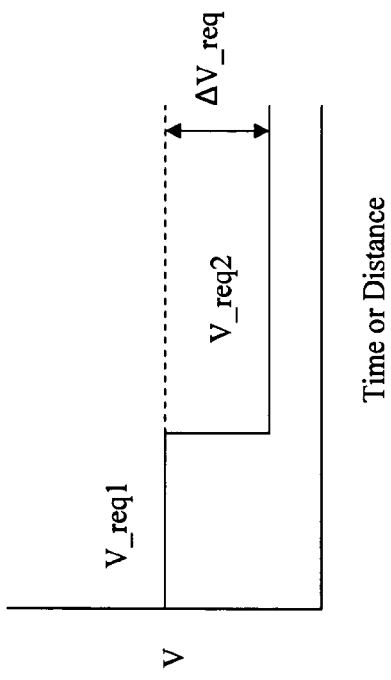
FIGS. 12a and 12b present a graphical representation of vehicle velocity (V) versus time or distance according to an embodiment of the present invention where set speed is changed in a one-to-one relationship with a change in required speed.
Figure 12B:
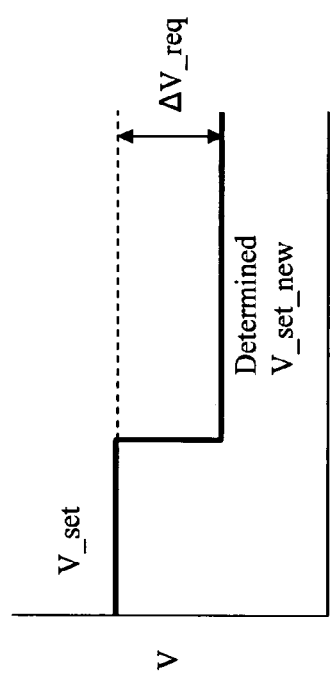

That is, according to this embodiment of the invention, any change in the required local speed will result in a one-to-one change in V_set. Note further that while the previous scenarios have been described where the required speed decreases, if the required speed increases, ΔV_req would be a positive number, and the thus determined V_set_new would increase by that positive number. If there is no increase speed prohibition routine as discussed above, according to some embodiments of the invention, V_set would increase to V_set_new. FIG. 12a and FIG. 12b schematically illustrate the change in speed based on the just described scenario.

Figure 13:
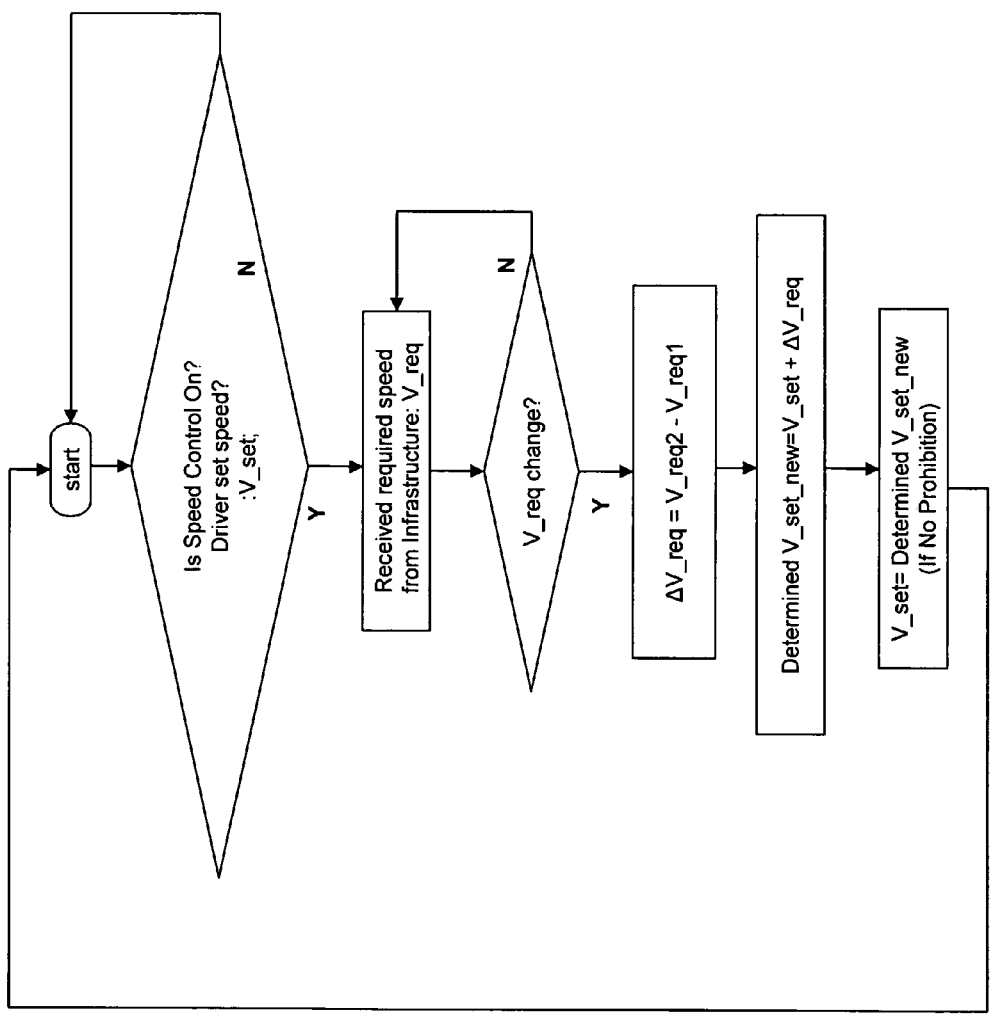
FIG. 13 presents a flow chart for an algorithm for implementing an embodiment of the present invention where set speed is changed in a one-to-one relationship with a change in required speed.

FIG. 13 presents an algorithm that may be used during implementation of the embodiment just described. Note that if there is an increase speed prohibition routine, V_set will not equal determined V_set_new in an embodiment of the present invention.

In a second exemplary technique described in the referenced applications, the set speed (V_set) may be changed based on a differentiation in speed between the first required speed (V_req1) and the second required speed of the vehicle (V_req2). However, the differentiation in speed is now in the form of a ratio of the second required speed to the first required speed. That is, the new set speed is determined based on a ratio of the second required speed (V_req2) and the first required speed (V_req1). That is, instead of changing the set speed by the exact difference between V_req1 and V_req2 in a one-to-one relationship, the set speed is changed by adjusting to the set speed based on a ratio of V_req2 and V_req1. Thus, determined V_set_new may be determined based on the equation $$\text{Determined } V\_set\_new = V\_set * \alpha\_\Delta V \quad (3)$$

where $$\alpha\_\Delta V = V\_req2 / V\_req1 \quad (4).$$

In an exemplary scenario according to this second embodiment, if V_req1 is 65 miles per hour, and V_req2 is 50 miles per hour, α_ΔV would be about 0.77 (50 divided by 65). That is, according to an embodiment of the invention, determined V_set_new would be roughly 77% of the value of V_set. Thus, by multiplying V_set by 0.77, determined V_set_new may be obtained. If, for example, V_set is 60 miles per hour, determined V_set_new would be 46 miles per hour (as opposed to 45 miles per hour in a one-to-one change relationship), as may be determined based on the above equation.

Figure 14A:
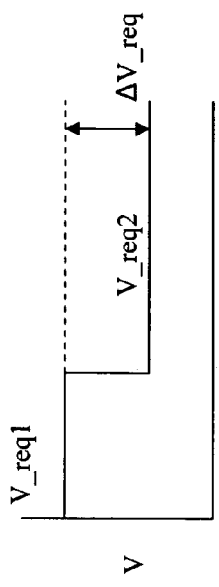
FIGS. 14a, 14b and 14c present a graphical representation of vehicle velocity (V) versus time or distance according to another embodiment of the present invention where set speed is changed based on a ratio of required speeds.
Figure 14B:
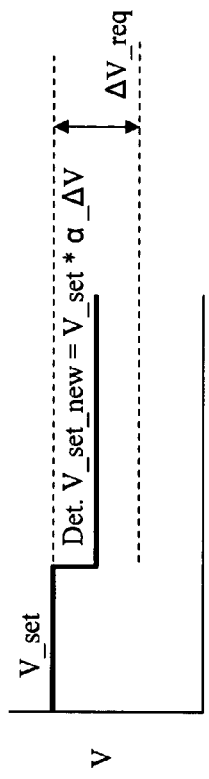
Figure 14C:
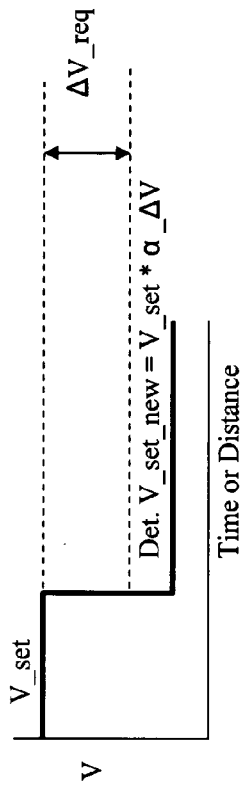

FIG. 14a shows a schematic of the change in required local speeds, where the change ΔV_req, is superimposed on FIGS. 14b and 14c, which depict how determined V_set_new may vary when practicing this embodiment. FIG. 14b shows how V_set may change based on the ratio of V_req2/V_req1, where V_set of FIG. 14b is a value lower than V_req1, and thus the change in the set speed is smaller than ΔV_req. Conversely FIG. 14C shows a scenario where V_set is higher than V_req1, and thus utilizing the ratio V_req2/V_req1, V_set may change by an amount that is greater than ΔV_req.

Figure 15:
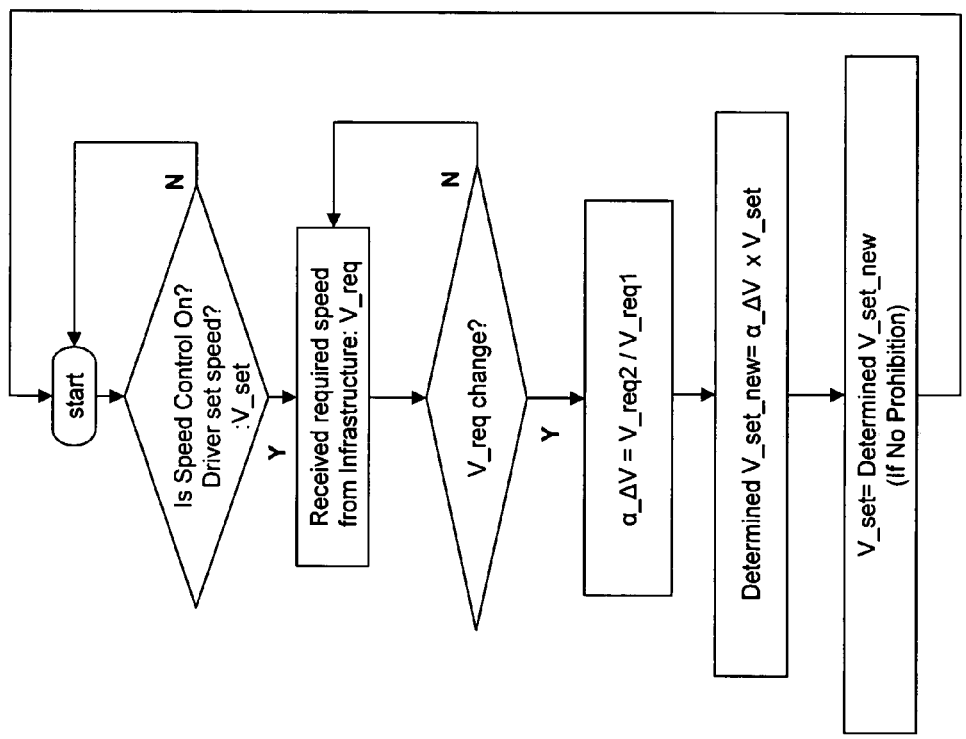
FIG. 15 presents a flow chart for an algorithm to implement another embodiment of the present invention where set speed is changed based on a ratio of required speeds.

FIG. 15 presents an algorithm that may be used during implementation of the embodiment just described. Note that if there is a speed increase prohibition routine, V_set will not equal determined V_set_new in an embodiment of the present invention.

Figure 16:
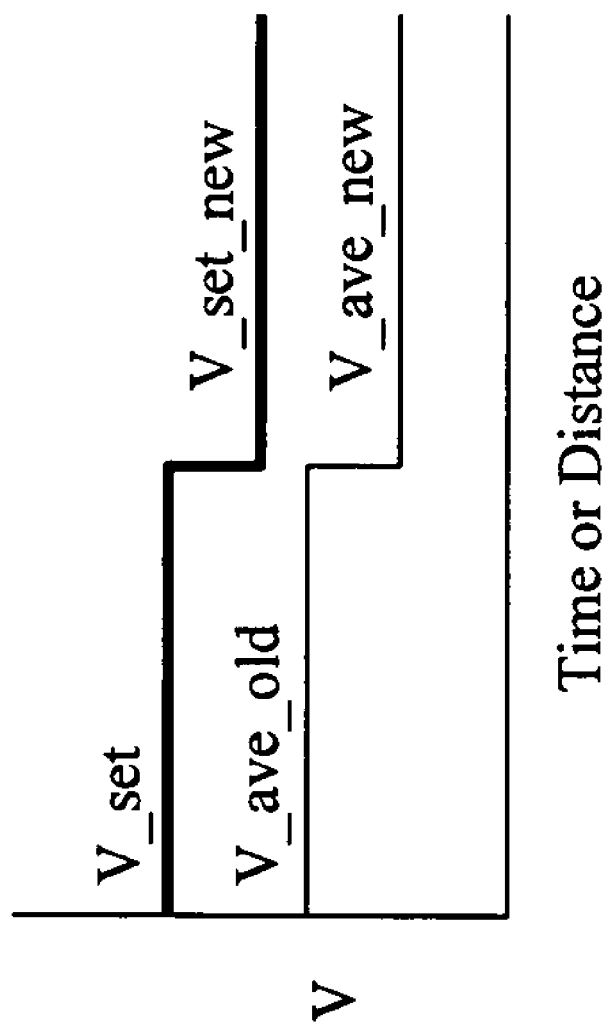
FIG. 16 presents a graphical representation of vehicle velocity (V) versus time or distance according to another embodiment of the present invention, where the set velocity of the host vehicle is changed in a one-to-one relationship with a change in average speeds of vehicles proximate the host vehicle.
Figure 17:
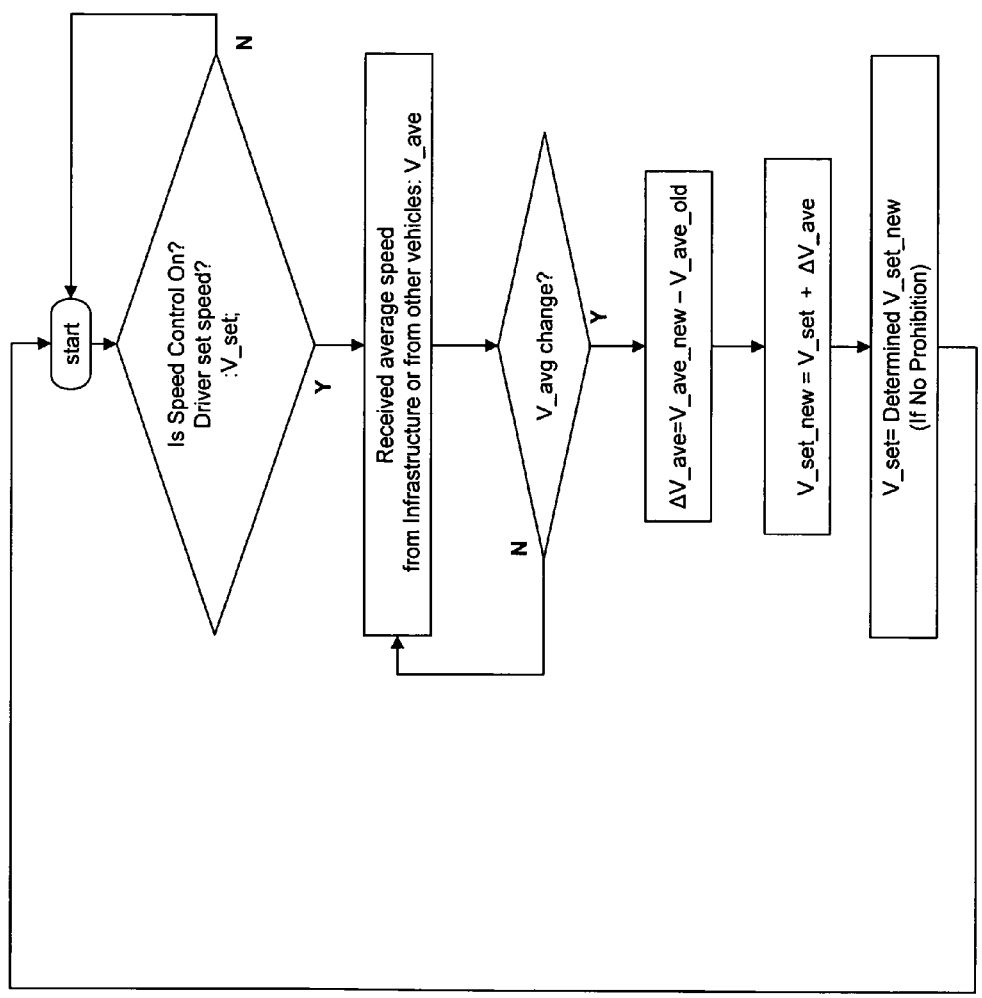
FIG. 17 presents a flow chart for an algorithm to implement another embodiment of the present invention, where the set velocity of the host vehicle is changed in a one-to-one relationship with a change in average speeds of vehicles proximate the host vehicle.

In another exemplary technique described in the referenced applications, there is a cooperative speed control system that relies on information relating to the speed of vehicles around the host vehicle. By way of example, if the average speed of the cars proximate/around the host vehicle, for example, the ten closest cars to the host vehicle, or, for example, all the cars within a 300 foot radius of the host vehicle on the same roadway as the host vehicle and traveling in the same direction as the host vehicle (300 feet in-front of, 300 feet in-back of, and along side of the host vehicle within the lanes of direction of travel) is 65 miles per hour during a first period of time, and then the average speed of vehicles proximate/around the host vehicle changes to 50 miles per hour during a second period of time, there would be a difference between the first average velocity (V_ave_old) and the second average velocity (V_ave_new) of 15 miles per hour. Accordingly, in some implementations, a determined new set speed may be determined by subtracting 15 miles per hour from the set speed, in a manner similar to equations (1) and (2) above. Thus, if the set speed was 60 miles per hour, the new set speed would be 45 miles per hour. As noted in the referenced applications, the set speed, and thus the determined set speed, may be adjusted in other ways, such as obtaining a ratio of the second average speed to the first average speed, and obtaining determined V_set_new in a manner similar to equations (3) and (4). FIG. 16 shows a schematic representation of a change in V_set as compared to V_ave_old and V_ave_new, where there is a one-to-one relationship to the change in V_ave_old and V_ave_new. FIG. 17 presents an exemplary algorithm for implementing this technique of cooperative speed control based on a one-to-one relationship of the change in average speeds of proximate vehicles to the change in set speeds. Of course, other algorithms may be used to obtain a change in set speed based on a ratio between the average speeds, etc. Note that if there is a speed increase prohibition routine, V_set will not equal determined V_set_new in some embodiments of the present invention.

In another exemplary technique described in the referenced applications, the cooperative speed control system comprises a system that records or otherwise learns drivers' set speeds as a function of required speeds. For example, such a system may include a memory that stores the current set speed and also stores the current required speed, where the two are linked. In a cooperative speed control system according to such an embodiment, when the system is engaged, the system may, upon receiving the required current speed from the infrastructure communication device, look up from the memory the set speed that is linked to the required current speed, and then set the determined new set speed (determined V_set_new) of the vehicle at the respective recorded speed. In an exemplary scenario, where, for example, the memory has recorded, for a required local speed of 65 miles per hour, that the driver usually sets the speed setting at 60 miles per hour, if the required speed is 65 miles per hour, the host vehicle set speed will be 60 miles per hour. If the memory has recorded that for a local required speed of 30 miles per hour, the driver sets the speed at 29 miles per hour, the host vehicle set speed will be 29 miles per hour. In other embodiments, a ratio may be stored in the memory, where the ratio is the ratio of the set speed to the required speed. For example, if the driver usually sets the speed at 60 miles per hour when the required speed is 65 miles per hour, a ratio of about 0.92 will be recorded for a required speed of 65 miles per hour. If the vehicle later drives in an area where the required speed is 65 miles per hour, the system will look up the ratio from the memory for a required speed of 65 miles per hour, and multiply the required speed by the ratio, thus obtaining 60 miles per hour in the current scenario. In other embodiments of the cooperative speed control, a difference in speed may be recorded in the memory. For example, in the above scenario, instead of a ratio, a value of minus 5 miles per hour will be recorded for a speed of 65 miles per hour. Thus, if the vehicle encounters a section of road where the required speed is 65 miles per hour, the system will obtain from the memory the difference in the speed for 65 miles per hour, and adjust the set speed accordingly, which in this case is 5 miles per hour lower than the required speed, and thus the set speed will be 60 miles per hour.

If the above technique is utilized in a cooperative speed control system according to some of the embodiments of the invention, if a determination is made that vehicle speed would otherwise automatically increase, a device according to the present invention might first determine whether conditions are met to permit such a speed increase and/or whether automatic speed increase has been prohibited. If there is no prohibition, automatic speed increase is permitted, and the vehicle will automatically increase in speed.

Figure 18:
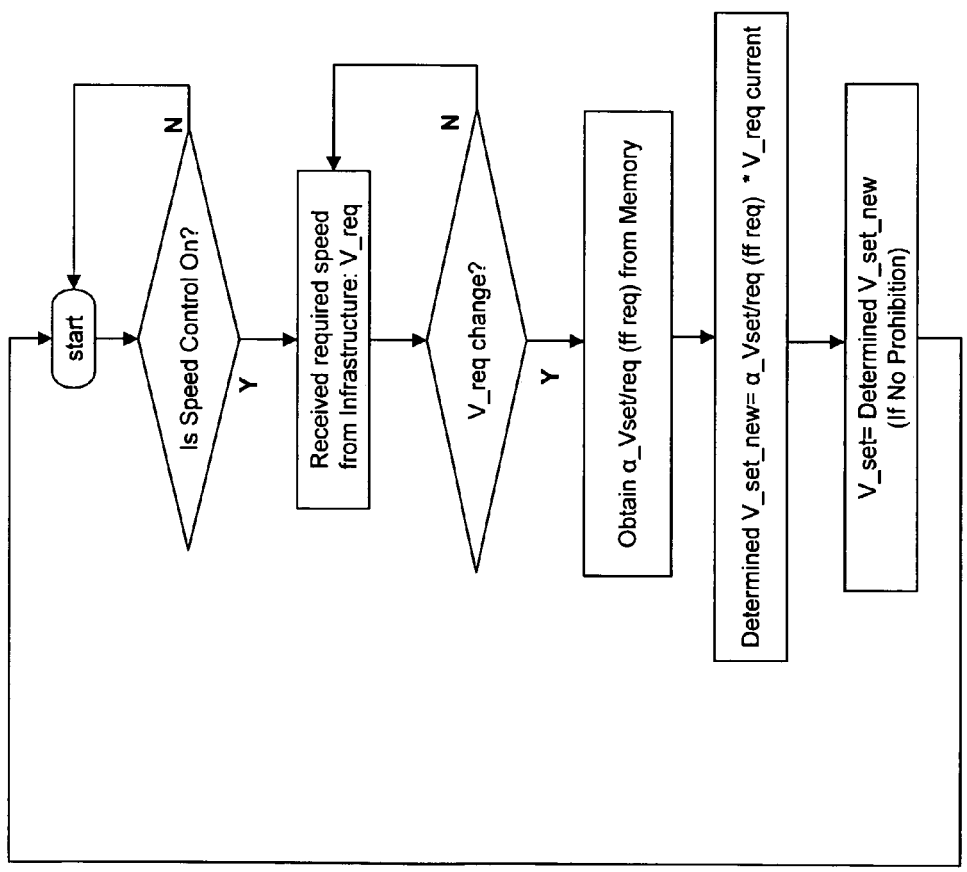
FIG. 18 presents a flow chart for an algorithm to implement another embodiment of the present invention, where the set velocity of the host vehicle is changed based on a ratio of set velocity to required speed as a function of required speed.

FIG. 18 presents an exemplary algorithm for implementing an embodiment of the speed control system just described. As may be seen, the ratio α_Vset/req is a function of the current required speed. The flow chart presented in FIG. 18 presents α_Vset/req (ff req) as a function of the required speed and is retrieved from memory. Note that if there is a speed increase prohibition routine, V_set will not equal determined V_set_new in some embodiments of the present invention.

As discussed above, an embodiment of the present invention analyzes a vehicle driver's current state to determine whether to prohibit an increase (or any change) in vehicle speed. Such an embodiment may utilize a device as just described, or a derivative thereof, that records or otherwise memorizes or learns driver driving habits as correlated to given conditions and/or a given stretch of roadway. If, in a later driving period, for example, on the same/similar roadway and/or under the same/similar conditions, the device determines that a driver is deviating from his or her "habitual" pattern, the device may determine that the driver is not attentive or is otherwise in a state that might result in impaired driver response time, and thus prohibit speed increase.

It is further noted that some embodiments of the present invention include a cooperative speed control system where all the logic and control components, including those used to determine whether to prohibit vehicle speed increase, are located in a single assembly, while other embodiments utilize multiple assemblies. Indeed, some embodiments of the invention may be practiced by taking a cooperative speed control system as disclosed in the above mentioned applications and adding a component that prevents a signal outputted from the system to a vehicle speed controller from reaching the vehicle speed controller in the event that vehicle speed increase is to be prohibited according to the present invention. In other embodiments, the software/firmware, etc., currently present in the cooperative speed control systems may be modified to obtain speed increase prohibition according to the present invention. All such designs, unless otherwise specified, would be included by the phrase "a device adapted to automatically control vehicle speed." That is, unless otherwise specified, the present invention is not limited to a specific design.

Embodiments of the present invention include devices, methods, and systems adapted to automatically control vehicle speed/prohibit an automatic increase in vehicle speed according to one or more of the embodiments described herein. For example, in some embodiments there will be a device with a processor that is adapted to receive data signals and output control signals after analyzing the received signals. The processor typically includes logic in the form of hardware and/or software. For example, the processor may include logic to determine a new set vehicle speed based on its determination of the local required speeds as determined from an evaluation of received signals indicative of the local required speeds. By signal indicative of a local required speed, it is meant any input into the processor that may be used by the processor to automatically determine any set vehicle speed. Such signals may include, but are not limited to, electronic signals. For example, a signal received by a processor could be a voltage signal where, for example 2.5 volts is indicative of a local required speed of 30 miles per hour, and 5 volts is indicative of a local required speed of 60 miles per hour, etc. Digital signals may also be received by the processor according to some embodiments of the invention, where the digital signals are indicative of various required speeds.

In some embodiments of the present invention, the processor is adapted to automatically determine new set vehicle speeds based on, for example, a first local required speed, a second local required speed, and the current set vehicle speed. For example, in the exemplary processor just described, where a new set vehicle speed is automatically determined based at least on the first local required speed, the second local required speed and the current set vehicle speed, the processor may determine a new set vehicle speed utilizing any information related to these three variables. That is, as long as the processor is manipulating data that is related to the first local required speed, the second local required speed, and the set speed, the processor is determining a new set vehicle speed based at least on the first local required speed, the second local required speed, and the set speed.

In another embodiment of the present invention, the processor is further configured to automatically initiate output of a signal to a vehicle speed controller to change the vehicle speed to the determined new set vehicle speed. Again, this outputted signal may take a variety of forms, provided that the outputted signal may be used to control the speed of the vehicle. Accordingly, some embodiments of the present invention also include a vehicle equipped with a processor as described herein and a vehicle with a vehicle speed controller in communication with a processor described herein. For example, the present invention may operate with a vehicle that has a speed control system such as a cruise control system, an adaptive cruise control system (ACC), etc.

In order for a processor to function to implement some of the embodiments disclosed herein, a processor according to some embodiments of the present invention includes logic to determine a differentiation in speed between the second local required speed and the first local required speed, where in some embodiments of the present invention, such as the first embodiment detailed above, the differentiation in speed is determined by subtracting the first local required speed from the second local required speed. Thus, if the first local required speed is greater than the second local required speed, a negative value for differentiation in speed will be obtained. The new set vehicle speed may be determined by adding the differentiation in speed (a negative number) to the current set vehicle speed, thus resulting in a new set vehicle speed that is lower than the current set vehicle speed. Note that the present invention may be alternatively practiced by subtracting the second local required speed from the first local required speed, and thus if the first local required speed is a number greater than the second local speed, a positive value will be obtained. The new set vehicle speed may now be determined by subtracting the differentiation in speed from the current set vehicle speed. Thus, through simple algebraic manipulation, the end result is the same. Therefore, an embodiment of the present invention includes obtaining a value for the differentiation in speed that is "equivalent" to a value determined by subtracting the first local speed from the second local speed. By use of the term "equivalent," it is meant that any algebraically appropriate method may be used to obtain the value. Thus, subtracting the first local required speed from the second local required speed is equivalent to subtracting the second local required speed from the first local required speed if the results are used properly. Other equivalent algebraic operations would also be covered by the term "equivalent."

In some embodiments of the present invention, the device adapted to automatically control vehicle speed includes a memory. This memory may be used to store variables such as the current required speed and/or the current set speed, etc. This memory may also store calculated variables that will be used at a later time. By way of example, if the current set speed is known and the current required speed is known, a differentiation in speed value may obtained by dividing the current set vehicle speed by the current (first) local required speed and stored in the memory such that when the required speed changes to the second local required speed, all that is necessary is to multiply the second local required speed by the already determined differentiation in speed, where the determined differentiation in speed may be readily obtained from the memory.

Embodiments of the present invention also include the use of a look-up table to determine various values. For example, a value indicative of a differentiation in speed between the second local required speed and the first local required speed that is equivalent to a value determined by subtracting the first local required speed from the second local required speed may be obtained by utilizing a look up table for such values as opposed to actually subtracting the values.

In another embodiment of the present invention, there is a device adapted to automatically control vehicle speed that includes a processor that is adapted to receive signals indicative of average speeds of other vehicles around the vehicle or otherwise proximate to the vehicle. By way of example, the signal(s) may be indicative of the average speed of the ten closest cars to the vehicle, including cars in front of, in back of and to the side of the vehicle.

In some embodiments of the present invention, the average speed of vehicles around/proximate the host vehicle may be utilized to determine a new set vehicle speed. In some embodiments of the present invention, a processor may receive (or calculate internally) a first signal indicative of a first average speed of vehicles proximate to the host vehicle and then receive (or calculate internally) a second signal indicative of the second average speed of vehicles proximate to the host vehicle. This second signal would be received (or calculated) after the first signal. In such embodiments, the device may automatically determine a new set vehicle speed based at least on the first average speed and the second average speed and the current vehicle speed and then automatically initiates an output of a signal to the vehicle's speed control to change the vehicle speed to the new set vehicle speed, providing that automatic vehicle speed increase prohibition is not implemented if the change in speed results in an increase in speed.

In some embodiments of the present invention, there is a device adapted to automatically control vehicle speed that includes a processor adapted to receive a plurality of first signals indicative of set vehicle speeds and a plurality of second signals indicative of respective required speeds and adapted to obtain a plurality of values indicative of respective differentiations between at least some of the set vehicle speeds and respective required speeds from at least some of the signals received by the processor. The device further includes a memory adapted to record at least some of the plurality of values indicative of respective differentiations between set vehicle speeds and respective required speeds such that at least some of the differentiations are linked to respective required speeds. The processor includes logic to automatically determine that a signal received by the processor is indicative of a current required speed and initiate output of a signal to a vehicle speed controller to determine a new set vehicle speed based on the respective differentiation linked to the required speed stored in the memory if the required speed stored in the memory is substantially the same as the current required speed.

In an exemplary scenario utilizing the embodiment just described, if the host vehicle typically has a set speed of 60 mph when the required speed is 65 mph, the processor will determine a differentiation in speed (5 mph, 0.92, etc.) and record that differentiation in the memory linked to the respective required speed of 65 mph, thus "learning" the routine of set vehicle speeds for given required speeds. Once the differentiations in speed for specific required speeds is recorded in a memory, the cooperative speed control system utilizes the respective differentiation in speed to obtain the set vehicle speed for a given required speed. For example, if the required speed is 65 mph, the set vehicle speed will be determined utilizing the differentiation for that required speed (5 mph, 0.92, etc.). In other embodiments of the invention, the set vehicle speed will be stored and linked to a required speed such that if, for example, the stored speed is 62 mph for a 65 mph required speed, if the vehicle again encounters a required speed of 65 mph, the new set vehicle speed will be 62 mph.

As discussed above, in some embodiments, such a routine may also be used to determine whether the driver of the vehicle is driving in a manner that would warrant automatic speed increase prohibition, as detailed above.

Some embodiments of the present invention include a device that is adapted to identify vehicles that are proximate/around the vehicle, determine the speeds of those vehicles and determine the average speed accordingly. However, other embodiments of the present invention include a device that receives, for example, a wireless communication from vehicles around the host vehicle relating to the respective speeds of those vehicles. That is, the vehicles around the host may communicate to the host vehicle their respective speeds, and, upon receiving this communication, the host vehicle may utilize this information to determine the average speed of the vehicles. Passive and active sensors may be used to determine the various speeds of vehicles around/proximate the host vehicle. By way of example, laser, radar, short range wireless communication, etc., may be used. Thus, any device or method which may be utilized to obtain the average speed of vehicles around/proximate to the host vehicle may be used to practice embodiments of the present invention.

In the scenarios described at the beginning of this disclosure, the required speeds (V_req1 and V_req2) were determined based on a received radio signal from an infrastructure communication device. The infrastructure communication device would be used by the government/private entity responsible for roadways to announce the required speed. Alternative methods of determining required local speeds are also applicable to the present invention. For example, advanced image recognition programming may be used to analyze an image of a speed limit sign to determine the required speed. Further, by way of example, bar codes may be placed along a roadway that may be scanned utilizing a laser sensor mounted on the vehicle so that the local required speed may be determined by the vehicle and utilized in the cooperative speed control system according to embodiments of the present invention. Still further, instead of a broadcast radio a broadcast laser may be utilized. In other embodiments of the present invention, map data with speed information linked to GPS coordinates may be preprogrammed into a computer onboard the vehicle and, in conjunction with an onboard GPS device, the local required speeds may be obtained from the map data. In yet other scenarios, information relating to the required speed may be obtained from other vehicles through wireless communication or the like. Any device, method or apparatus that may be used to convey a local required speed to a cooperative speed control system according to the present invention may be used to practice the present invention.

It will be seen that various algorithms have been presented herein to implement various embodiments of the invention. In these algorithms, steps are listed serially only for convenience, except where necessary. That is, many steps presented in the algorithms as being performed after other steps may be performed parallel to or before these other steps presented in the algorithms. Still further, an algorithm may be used that is based on a yes no format such that a "no" would break the algorithm/reset the algorithm. However, owing to advances in processing power, embodiments of the present invention may be utilized where portions of the algorithm and/or where the entire algorithm is/are run through regardless of results of portions of the algorithm. Thus, the algorithms present only one example of many possible algorithms to practice the present invention. Still further, it is noted that the flow charts presented herein are high level flow charts in that key information sufficient to write computer codes is provided.

The present invention includes methods of practicing the invention, software to practice the invention, and apparatuses configured to implement the present invention. Accordingly, the present invention includes a program product and hardware and firmware for implementing algorithms to practice the present invention, as well as the systems and methods described herein, and also for the control of the devices and implementation of the methods described herein.

It is noted that the term "vehicle" as used herein encompasses cars, trucks, SUVs, minivans, and all other types of land vehicles.

It is noted that the term "processor," as used herein, encompasses both simple circuits made from a few discrete components and complex circuits, as well as computer processors, and the term "logic" as used herein includes logic in the form of software and firmware, etc.

It is further noted that embodiments of the present invention extend to methods and infrastructure devices/systems for implementing the cooperative speed control system. By way of example, embodiments of the present invention include a roadway where a first infrastructure communication device is positioned proximate to the roadway and a second infrastructure communication device is positioned proximate to the roadway at a position "down the road" from the first device, where the devices broadcast a signal receivable by a vehicle with a cooperative speed control system according to the present invention.

Given the disclosure of the present invention, one versed in the art would appreciate that there are other embodiments and modifications within the scope and spirit of the present invention. Accordingly, all modifications attainable by one versed in the art from the present disclosure within the scope and spirit of the present invention are to be included as further embodiments of the present invention.

What is claimed is:

1. A device adapted to automatically control vehicle speed, comprising:
   a processor adapted to receive at least a first signal indicative of a first local required speed for a first portion of a roadway system and a second signal indicative of a second local required speed for a second portion of the roadway system different from the first portion of the roadway system received after the first signal; wherein the processor includes logic to:
   automatically determine whether the first local required speed is greater than the second local required speed; and only if the first local required speed is at least one of (i) greater than or (ii) equal to the second local required speed, automatically initiate output of a signal to a vehicle speed controller to change vehicle speed to a new set vehicle speed.

2. The device according to claim 1, wherein the processor includes logic to output a signal to activate an indicator to indicate information to a driver that the second local required speed is greater than the first local required speed.

3. A vehicle, comprising:
a body, and
a device according to claim 1.

4. A device adapted to automatically control vehicle speed, comprising:
a processor adapted to receive at least a first signal indicative of a first local required speed and a second signal indicative of a second local required speed received after the first signal: wherein the processor includes logic to:
automatically determine whether the first local required speed is greater than the second local required speed; and
only if the first local required speed is at least one of (i) greater than or (ii) equal to the second local required speed, automatically initiate output of a signal to a vehicle speed controller to change vehicle speed to a new set vehicle speed,
wherein the processor is adapted to receive a third signal indicative of a value of a current set vehicle speed, and wherein the processor further includes logic to automatically determine the new set vehicle speed based at least on the first local required speed, the second local required speed, and the current set vehicle speed.

5. The device according to claim 4, wherein the first local required speed is for a first portion of a roadway system and the second local required speed is for a second portion of the roadway system different from the first portion of the roadway system.

6. A device adapted to automatically control vehicle speed, comprising:
a processor adapted to receive at least a first signal indicative of a current set vehicle speed and a second signal indicative of a change in local required speed; wherein the processor includes logic to:
automatically determine a new set vehicle speed based at least on the change in local required speed and the current set vehicle speed; and
only if the current set vehicle speed is at least one of (i) greater than or (ii) equal to the determined new set vehicle speed, automatically initiate output of a signal to a vehicle speed controller to change vehicle speed to the determined new set vehicle speed.

7. The device according to claim 6, wherein the processor includes logic to output a signal to activate an indicator to indicate information to a driver that the determined new set vehicle speed is greater than the current set vehicle speed.

8. A vehicle, comprising:
a body, and
a device according to claim 6.

9. The device according to claim 6, wherein the change in local required speed is determined based on a comparison of information contained in at least a signal indicative of a first local required speed for a first portion of a roadway system received by the processor and a signal indicative of a second local required speed for a second portion of the roadway system different from the first portion of the roadway system received by the processor after the first signal.

10. A device adapted to automatically control vehicle speed, comprising:
a processor adapted to receive at least a first signal indicative of a first local required speed for a first portion of a roadway system, a second signal indicative of a second local required speed for a second portion of the roadway system different from the first portion of the roadway system received after the first signal, and a third signal indicative of a value of a current set vehicle speed;
wherein the processor includes logic to:
automatically determine a new set vehicle speed based at least on the first local required speed, the second local required speed, and the current set vehicle speed;
automatically initiate output of a signal to a vehicle speed controller to change vehicle speed to the new set vehicle speed; and
output a signal to activate an indicator to indicate information to a driver indicative of at least one of (i) that the second local required speed is greater than the first local required speed and (ii) that the determined new set vehicle speed is greater than the current set vehicle speed.

11. A device adapted to automatically control vehicle speed, comprising:
a processor adapted to receive input indicative of a current state of environment around a vehicle and automatically output a signal to control a vehicle speed controller to at least automatically increase vehicle speed to a determined new set vehicle speed in response to a change in local required speed determined based on a comparison of information contained in at least a signal indicative of a first local required speed for a first portion of a roadway system received by the processor and a signal indicative of a second local required speed for a second portion of the roadway system different from the first portion of the roadway system received by the processor after the first signal, wherein the processor includes logic to:
automatically analyze the input to determine a current state of environment around the vehicle; and
if the determined current state of the environment around the vehicle is indicative of at least one predetermined environment, automatically prohibit the vehicle speed controller from increasing vehicle speed.

12. The device according to claim 11, wherein the processor includes logic to:
automatically analyze the input and determine that the input is indicative of a current state of environment around the vehicle such that there is an increased chance of a need to reduce vehicle speed; and
only if the determined current state of the environment around the vehicle is such that there is an increased chance of a need to reduce vehicle speed, automatically prohibit an increase in vehicle speed to the determined new set vehicle speed.

13. The device according to claim 11, wherein the processor includes logic to:
automatically analyze the input and determine that the input is indicative of a current state of environment around the vehicle that includes at least one of:
(a) the vehicle is driving around a corner,
(b) the vehicle is approaching a corner,
(c) the vehicle is passing through an intersection,
(d) the vehicle is approaching an intersection,
(e) the vehicle is approaching or on an on-ramp,
(f) the vehicle is approaching or on an off-ramp,
(g) the vehicle is driving on a congested road, (h) the vehicle is approaching a work zone,
(i) the vehicle is driving in a work zone,
(j) the vehicle is approaching a traffic light, and
(k) the vehicle is driving in a residential area; and
only if the determined current state of the environment around the vehicle is indicative of at least one predetermined environment that includes at least one of:
(aa) the vehicle is driving around a corner,
(bb) the vehicle is approaching a corner,
(cc) the vehicle is passing through an intersection,
(dd) the vehicle is approaching an intersection,
(ee) the vehicle is approaching or on an on-ramp,
(ff) the vehicle is approaching or on an off-ramp,
(gg) the vehicle is driving on a congested road,
(hh) the vehicle is approaching a work zone,
(ii) the vehicle is driving in a work zone,
(jj) the vehicle is approaching a traffic light, and
(kk) the vehicle is driving in a residential area, automatically prohibit an increase in vehicle speed to the determined new set vehicle speed.

14. The device according to claim 11, wherein the processor includes logic to:
automatically analyze the input and determine that the input is indicative of a current state of environment around the vehicle such that there is an increased chance of reduced driver control of the vehicle; and
only if the determined current state of the environment around the vehicle is such that there is an increased chance of reduced driver control of the vehicle, automatically prohibit an increase in vehicle speed to the determined new set vehicle speed.

15. The device according to claim 11, wherein the processor includes logic to:
automatically analyze the input and determine that the input is indicative of a current state of environment around the vehicle that includes at least one of:
(a) the vehicle is driving on a surface with a low coefficient of friction,
(b) the vehicle is driving in rain,
(c) the vehicle is driving in snow,
(d) the vehicle is driving in icy conditions, and
(e) the vehicle is driving in low visibility conditions; and
only if the determined current state of the environment around the vehicle is indicative of at least one predetermined environment that includes at least one of:
(aa) the vehicle is driving on a surface with a low coefficient of friction,
(bb) the vehicle is driving in rain,
(cc) the vehicle is driving in snow,
(dd) the vehicle is driving in icy conditions, and
(ee) the vehicle is driving in low visibility conditions, automatically prohibit an increase in vehicle speed to the determined new set vehicle speed.

16. A device adapted to automatically control vehicle speed, comprising:
a processor adapted to receive at least a first signal indicative of a first local required speed for a first portion of a roadway system, a second signal indicative of a second local required speed for a second portion of the roadway system different from the first portion of the roadway system received after the first signal, a third signal indicative of a value of a current set vehicle speed and an input indicative of a current state of environment around the vehicle; wherein the processor includes logic to:
automatically determine a new set vehicle speed based at least on the first local required speed, the second local required speed, and the current set vehicle speed;
automatically determine at least one of (i) whether the first local required speed is less than the second local required speed and (ii) whether the current set vehicle speed is less than the determined new set vehicle speed;
automatically analyze the input to determine the current state of environment around the vehicle; and
if the determined current state of the environment around the vehicle is indicative of at least one predetermined environment, and if (i) the first local required speed is less than the second local required speed or (ii) the current set vehicle speed is less than the new set vehicle speed, automatically prohibit a vehicle speed controller from changing a vehicle speed to the determined new set vehicle speed.

17. A device adapted to automatically control vehicle speed, comprising:
a processor adapted to receive input indicative of a current state of environment around the vehicle and automatically output a signal to control a vehicle speed controller to at least automatically increase vehicle speed to a determined new set vehicle speed in response to a change in local required speed determined based on a comparison of information contained in at least a signal indicative of a first local required speed for a first portion of a roadway system received by the processor and a signal indicative of a second local required speed for a second portion of the roadway system different from the first portion of the roadway system received by the processor after the first signal, wherein the processor includes logic to:
automatically analyze the input to determine a current state of environment around the vehicle; and
only if the current state of the environment around the vehicle is indicative of at least one predetermined environment, automatically initiate output of a signal to the vehicle speed controller to change vehicle speed to the new set vehicle speed.

18. The device according to claim 17, wherein the processor includes logic to:
automatically analyze the input and determine that the input is indicative of a current state of environment around the vehicle such that there is at least one of a reduced chance and a normal chance of a need to reduce vehicle speed; and
only if the determined current state of the environment around the vehicle is such that there is at least one of a reduced chance and a normal chance of a need to reduce vehicle speed, automatically initiate output of a signal to the vehicle speed controller to change vehicle speed to the determined new set vehicle speed.

19. The device according to claim 17, wherein the processor includes logic to:
automatically analyze the input and determine that the input is indicative of a current state of environment around the vehicle that includes at least one of:
(a) the vehicle is driving on a straight segment of road; and
(b) the vehicle is driving on a non-congested road; and
only if the determined current state of the environment around the vehicle is indicative of at least one predetermined environment that includes at least one of:
(aa) the vehicle is driving on a straight segment of road; and
(bb) the vehicle is driving on a non-congested road, automatically initiate output of a signal to the vehicle speed controller to change vehicle speed to the determined new set vehicle speed.

20. The device according to claim 17, wherein the processor includes logic to:
automatically analyze the input and determine that the input is indicative of a current state of environment around the vehicle such that there is at least one of a reduced chance and a normal chance of reduced driver control of the vehicle; and
only if the determined current state of the environment around the vehicle is such that there is at least one of a reduced chance and a normal chance of reduced driver control of the vehicle, automatically initiate output of a signal to the vehicle speed controller to change vehicle speed to the determined new set vehicle speed.

21. The device according to claim 17, wherein the processor includes logic to:
automatically analyze the input and determine that the input is indicative of a current state of environment around the vehicle that includes at least one of:
 (a) the vehicle is driving on a surface with a normal coefficient of friction,
 (b) the vehicle is driving in clear conditions,
 (c) the vehicle is driving in above-freezing conditions,
 (d) the vehicle is driving in normal visibility conditions; and
only if the determined current state of the environment around the vehicle is indicative of at least one predetermined environment that includes at least one of:
 (aa) the vehicle is driving on a surface with a normal coefficient of friction,
 (bb) the vehicle is driving in clear conditions,
 (cc) the vehicle is driving in above-freezing conditions,
 (dd) the vehicle is driving in normal visibility conditions, automatically initiate output of a signal to the vehicle speed controller to change vehicle speed to the determined new set vehicle speed.

22. A device adapted to automatically control vehicle speed, comprising:
a processor adapted to receive at least a first signal indicative of a first local required speed for a first portion of a roadway system, a second signal indicative of a second local required speed for a second portion of the roadway system different from the first portion of the roadway system received after the first signal, a third signal indicative of a value of a current set vehicle speed and an input indicative of a current state of environment around the vehicle; wherein the processor includes logic to:
automatically determine a new set vehicle speed based at least on the first local required speed, the second local required speed, and the current set vehicle speed;
automatically determine at least one of (i) whether the first local required speed is less than the second local required speed and (ii) whether the current set vehicle speed is less than the determined new set vehicle speed; and
if
 (A) the current state of the environment around the vehicle is indicative of at least one predetermined environment and at least one of (iii) the first local required speed is less than the second local required speed and (iv) the current set vehicle speed is less than the determined new set vehicle speed; or
 (B) at least one of (v) the first local required speed is greater than or equal to the second local required speed and (vi) the current set vehicle speed is greater than or equal to the determined new set vehicle speed,
automatically initiate output of a signal to a vehicle speed controller to change vehicle speed to the new set vehicle speed.

23. A device adapted to automatically control vehicle speed, comprising:
a processor adapted to receive input indicative of a current state of a driver of the vehicle and automatically output a signal to control a vehicle speed controller to at least automatically increase vehicle speed to a determined new set vehicle speed in response to a change in local required speed determined based on a comparison of information contained in at least a signal indicative of a first local required speed for a first portion of a roadway system received by the processor and a signal indicative of a second local required speed for a second portion of the roadway system different from the first portion of the roadway system received by the processor after the first signal, wherein the processor includes logic to:
determine whether the current state of a driver meets at least one predetermined requirement, and
if the current state of a driver of the vehicle meets at least one predetermined requirement, automatically prohibit the vehicle speed controller from increasing vehicle speed.

24. The device according to claim 23, wherein the processor includes logic to:
automatically analyze the input and determine that the input is indicative of a current state of a driver of the vehicle such that there is an increased chance of diminished driver reaction time; and
only if the determined current state of the driver of the vehicle is such that there is an increased chance of diminished driver reaction time, automatically prohibit an increase in vehicle speed to the determined new set vehicle speed.

25. The device according to claim 23, wherein the processor includes logic to:
automatically analyze the input and determine that the input is indicative of a current state of the driver of the vehicle that includes at least one of:
 (a) the driver is drowsy,
 (b) the driver is distracted,
 (c) the driver is inattentive,
 (d) the driver is looking away from a direction ahead of the vehicle, and
 (e) the driver is multitasking; and
only if the determined current state of the driver of the vehicle is indicative of at least one predetermined state that includes at least one of:
 (aa) the driver is drowsy,
 (bb) the driver is distracted,
 (cc) the driver is inattentive,
 (dd) the driver is looking away from a direction ahead of the vehicle, and
 (ee) the driver is multitasking, automatically prohibit an increase in vehicle speed to the determined new set vehicle speed.

26. A device adapted to automatically control vehicle speed, comprising:
a processor adapted to receive at least a first signal indicative of a first local required speed for a first portion of a roadway system, a second signal indicative of a second local required speed for a second portion of the roadway system different from the first portion of the roadway system received after the first signal, a third signal indicative of a value of a current set vehicle speed and an input indicative of a current state of a driver of the vehicle; wherein the processor includes logic to:

automatically determine a new set vehicle speed based at least on the first local required speed, the second local required speed, and the current set vehicle speed;

automatically determine at least one of (i) whether the first local required speed is less than the second local required speed and (ii) whether the current set vehicle speed is less than the determined new set vehicle speed; and if the current state of a driver of the vehicle meets at least one predetermined requirement, and if (i) the first local required speed is less than the second local required speed or (ii) the current set vehicle speed is less than the new set vehicle speed, automatically prohibit a vehicle speed controller from changing a vehicle speed to the determined new set vehicle speed.

27. A device adapted to automatically control vehicle speed, comprising:

a processor adapted to receive input indicative of a current state of a driver of the vehicle and automatically output a signal to control a vehicle speed controller to at least automatically increase vehicle speed to a determined new set vehicle speed in response to a change in local required speed determined based on a comparison of information contained in at least a signal indicative of a first local required speed for a first portion of a roadway system received by the processor and a signal indicative of a second local required speed for a second portion of the roadway system different from the first portion of the roadway system received by the processor after the first signal, wherein the processor includes logic to:

determine whether the current state of a driver meets at least one predetermined requirement, and only if the current state of a driver of the vehicle meets at least one predetermined requirement, automatically initiate output of a signal to a vehicle speed controller to change vehicle speed to the new set vehicle speed.

28. The device according to claim 27, wherein the processor includes logic to:

automatically analyze the input and determine that the input is indicative of a current state of a driver of the vehicle such that there is at least one of a reduced chance and a normal chance of diminished driver reaction time; and only if the determined current state of the driver of the vehicle is such that there is at least one of a reduced chance and a normal chance of diminished driver reaction time, automatically initiate output of a signal to a vehicle speed controller to change vehicle speed to the new set vehicle speed.

29. A device adapted to automatically control vehicle speed, comprising:

a processor adapted to receive at least a first signal indicative of a first local required speed for a first portion of a roadway system, a second signal indicative of a second local required speed for a second portion of the roadway system different from the first portion of the roadway system received after the first signal, a third signal indicative of a value of a current set vehicle speed and an input indicative of a current state of a driver of the vehicle; wherein the processor includes logic to:

automatically determine a new set vehicle speed based at least on the first local required speed, the second local required speed, and the current set vehicle speed;

automatically determine at least one of (i) whether the first local required speed is less than the second local required speed and (ii) whether the current set vehicle speed is less than the determined new set vehicle speed; and if:
(A) the current state of a driver of the vehicle meets at least one predetermined requirement and at least one of (iii) the first local required speed is less than the second local required speed and (iv) the current set vehicle speed is less than the determined new set vehicle speed; or (B) at least one of (v) the first local required speed is greater than or equal to the second local required speed and (vi) the current set vehicle speed is greater than or equal to the determined new set vehicle speed, automatically initiate output of a signal to a vehicle speed controller to change vehicle speed to the new set vehicle speed.

* * * * *